United States Patent
Natsui et al.

(10) Patent No.: US 8,846,813 B2
(45) Date of Patent: Sep. 30, 2014

(54) OPTICAL PRESSURE-SENSITIVE ADHESIVE SHEET

(75) Inventors: Masatomo Natsui, Osaka (JP); Yoshihito Takami, Osaka (JP); Kenta Yamashita, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/457,880

(22) Filed: Apr. 27, 2012

(65) Prior Publication Data

US 2013/0005909 A1     Jan. 3, 2013

(30) Foreign Application Priority Data

Apr. 28, 2011   (JP) ................................. 2011-101855

(51) Int. Cl.
| | |
|---|---|
| C08F 8/00 | (2006.01) |
| C08L 33/02 | (2006.01) |
| C08L 33/04 | (2006.01) |
| C09J 133/14 | (2006.01) |
| C09J 133/08 | (2006.01) |
| C09J 7/00 | (2006.01) |
| C08L 33/14 | (2006.01) |
| C08L 33/08 | (2006.01) |

(52) U.S. Cl.
CPC ............. C09J 133/14 (2013.01); C09J 133/08 (2013.01); C09J 7/00 (2013.01); *C08L 33/14* (2013.01); *C09J 2433/00* (2013.01); *C09J 2201/606* (2013.01); *C08L 33/08* (2013.01)
USPC ........... 525/204; 525/205; 525/217; 525/218; 525/221; 525/222; 525/233; 525/238

(58) Field of Classification Search
USPC ......... 525/204, 205, 217, 218, 221, 222, 233, 525/238
See application file for complete search history.

(56) References Cited

U.S. PATENT DOCUMENTS

| | | | |
|---|---|---|---|
| 4,522,971 A | 6/1985 | DeBergalis et al. | |
| 5,852,129 A | 12/1998 | Kusakabe et al. | |
| 6,552,145 B1 | 4/2003 | Okada et al. | |
| 6,858,295 B2 * | 2/2005 | Diehl et al. | 428/343 |
| 7,385,007 B2 * | 6/2008 | Moroishi et al. | 525/192 |
| 8,299,182 B2 * | 10/2012 | Inokuchi et al. | 525/192 |
| 2003/0063237 A1 | 4/2003 | Okada et al. | |
| 2003/0232192 A1 | 12/2003 | Kishioka et al. | |
| 2004/0191509 A1 | 9/2004 | Kishioka et al. | |
| 2009/0104450 A1 | 4/2009 | Inoue | |

FOREIGN PATENT DOCUMENTS

| | | |
|---|---|---|
| CN | 1400477 A | 3/2003 |
| JP | 2001-089731 A | 4/2001 |
| JP | 2003238915 A | 8/2003 |
| JP | 2003342542 A | 12/2003 |
| JP | 2004231723 A | 8/2004 |
| JP | 2004263084 A | 9/2004 |
| JP | 2009-120805 A | 6/2009 |
| JP | 2012-177022 A | 9/2012 |

OTHER PUBLICATIONS

Japanese Office Action corresponding to Japanese Patent Application No. 2011-101855, dated Jun. 30, 2014.

* cited by examiner

*Primary Examiner* — Nathan M Nutter
(74) *Attorney, Agent, or Firm* — Sughrue Mion, PLLC

(57) ABSTRACT

The present invention provides an optical pressure-sensitive adhesive sheet excellent in anti-foaming release property in which whitening due to humidification hardly occurs. The invention relates to an optical pressure-sensitive adhesive sheet including a pressure-sensitive adhesive layer formed from a pressure-sensitive adhesive composition including: an acrylic polymer (A) which has a weight average molecular weight of 100,000 to 3,000,000 and is formed from a component including, as essential monomer components, a monomer having a nitrogen atom in a molecule thereof and a monomer having a hydroxyl group in a molecule thereof; and an acrylic polymer (B) having a weight average molecular weight of 1,000 to 30,000.

19 Claims, No Drawings

OPTICAL PRESSURE-SENSITIVE ADHESIVE SHEET

BACKGROUND OF THE INVENTION

1. Technical Field

The present invention relates to an optical pressure-sensitive adhesive sheet to be used in lamination of an optical member, manufacture of an optical product, or the like.

2. Background Art

Recently, in various fields, display devices such as a liquid crystal display (LCD) or an input device used by combining with the display device, such as a touch panel, has been widely used. In manufacturing of the display device or the input device, a pressure-sensitive adhesive sheet (pressure-sensitive adhesive tape) is used for laminating an optical member. For example, the transparent pressure-sensitive adhesive sheet is used for laminating the touch panel and various display devices or optical members (e.g., a protective plate) (for example, see Patent Documents 1 to 3).

As the application of display devices or input devices is expanded, pressure-sensitive adhesive sheets used in these devices have been required not only to have high transparency in a normal state but also to maintain the high transparency even under various environments. Specifically, it is required that whitening (white turbidity) should not occur due to humidification (for example, due to preservation under a high-temperature and high-humidity environment), and an appearance of an optical member, an optical product or the like to which the pressure-sensitive adhesive sheet is laminated or visibility of a display part (image display part) should not be deteriorated.

As a pressure-sensitive adhesive for directly laminating to a filter for a plasma display, the pressure-sensitive adhesive in which whitening hardly occurs even due to the humidification has been proposed (see Patent Document 4).

Patent Document 1: JP 2003-238915 A
Patent Document 2: JP 2003-342542 A
Patent Document 3: JP 2004-231723 A
Patent Document 4: JP 2004-263084 A

SUMMARY OF THE INVENTION

However, when the pressure-sensitive adhesive is laminated to the optical member or the like, although the appearance of the optical member or the visibility of the display part is not negatively influenced under a humidified condition, there are problems in that foam or release is easily caused at an interface with an adherend under a high temperature environment, and adhesion reliability is deteriorated at a high temperature.

That is, a transparent pressure-sensitive adhesive sheet, in which whitening due to humidification hardly occurs, and foam or release is hardly caused at a high temperature, has been not yet obtained.

Therefore, the present invention has been made in an effort to provide an optical pressure-sensitive adhesive sheet in which an anti-foaming release property (a property which hardly causes foam or release at an interface between an adherend and the pressure-sensitive adhesive sheet under a high-temperature environment) is excellent and whitening due to humidification hardly occurs. In this specification, a property in which whitening (white turbidity) of the pressure-sensitive adhesive sheet due to humidification hardly occurs is called "anti-white turbidity", in some cases.

Accordingly, the present inventors have intensively studied in order to solve the problems. As a result, the inventors have found out that an optical pressure-sensitive adhesive sheet, in which anti-foaming release property is excellent and whitening due to humidification hardly occurs, can be obtained by forming a pressure-sensitive adhesive layer in the pressure-sensitive adhesive sheet from a pressure-sensitive adhesive composition at least containing an acrylic polymer (A) which has a predetermined weight average molecular weight and is formed from a component including a specific monomer as an essential monomer component, and an acrylic polymer (B) having a predetermined weight average molecular weight smaller than the weight average molecular weight of the acrylic polymer (A). The present invention has been completed based on these findings.

That is, the present invention provides an optical pressure-sensitive adhesive sheet, including:

a pressure-sensitive adhesive layer formed from a pressure-sensitive adhesive composition including: an acrylic polymer (A) which has a weight average molecular weight of 100,000 to 3,000,000 and is formed from a component including, as essential monomer components, a monomer having a nitrogen atom in a molecule thereof and a monomer having a hydroxyl group in a molecule thereof; and an acrylic polymer (B) having a weight average molecular weight of 1,000 to 30,000.

In the optical pressure-sensitive adhesive sheet, the component forming the acrylic polymer (A) preferably further includes, as a monomer component, alkyl(meth)acrylate having a linear or branched alkyl group.

In the optical pressure-sensitive adhesive sheet, a content of the alkyl(meth)acrylate having a linear or branched alkyl group is preferably 30 wt % to 89 wt % based on a total amount (100 wt %) of the monomer components forming the acrylic polymer (A).

In the optical pressure-sensitive adhesive sheet, the acrylic polymer (B) is preferably formed from a component including, as essential monomer components, (meth)acrylate having a cyclic structure in a molecule thereof, and alkyl(meth)acrylate having a linear or branched alkyl group.

In the optical pressure-sensitive adhesive sheet, a content of the (meth)acrylate having a cyclic structure in a molecule thereof is preferably 10 wt % to 90 wt %, and a content of the alkyl(meth)acrylate having a linear or branched alkyl group is preferably 10 wt % to 90 wt %, based on a total amount (100 wt %) of the monomer components forming the acrylic polymer (B).

In the optical pressure-sensitive adhesive sheet, a content of the monomer having a nitrogen atom in a molecule thereof is preferably 1 wt % to 30 wt % based on a total amount (100 wt %) of the monomer components forming the acrylic polymer (A).

In the optical pressure-sensitive adhesive sheet, a content of the monomer having a hydroxyl group in a molecule thereof is preferably 10 wt % to 50 wt % based on a total amount (100 wt %) of the monomer components forming the acrylic polymer (A).

In the optical pressure-sensitive adhesive sheet, a content of the acrylic polymer (B) in the pressure-sensitive adhesive composition is preferably 1 part by weight to 50 parts by weight based on 100 parts by weight of the acrylic polymer (A).

In the optical pressure-sensitive adhesive sheet, the following requirements are preferably satisfied:

a difference between a haze of the optical pressure-sensitive adhesive sheet immediately after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 30 minutes after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 1 hour after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 3 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%; and a difference between a haze of the optical pressure-sensitive adhesive sheet 6 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%.

Since the optical pressure-sensitive adhesive sheet of the present invention has the above constitution, the anti-foaming release property is excellent and the whitening due to humidification hardly occurs (that is, the anti-white turbidity is excellent). As a result, when optical members are laminated by using the optical pressure-sensitive adhesive sheet of the present invention, floating or releasing is hardly caused from the optical member even under a high-temperature environment, and whitening (white turbidity) due to humidification (for example, preservation under a high-temperature and high-humidity environment) hardly occurs. Accordingly, the pressure-sensitive adhesive sheet of the present invention hardly has a bad influence on an appearance of an optical member or a product in which the member is used or visibility of a display part and the like, and is useful to manufacture, particularly, a high-quality optical member or optical product.

DETAILED DESCRIPTION OF THE INVENTION

The optical pressure-sensitive adhesive sheet of the present invention (hereinafter, briefly referred to as a "pressure-sensitive adhesive sheet of the present invention" in some cases) includes at least a pressure-sensitive adhesive layer (hereinafter, referred to as a "pressure-sensitive adhesive layer of the present invention" in some cases) formed from a pressure-sensitive adhesive composition containing an acrylic polymer (referred to as an "acrylic polymer (A)") which has a weight average molecular weight of 100,000 to 3,000,000 and is formed from a component including, as essential monomer components, a monomer having a nitrogen atom in a molecule thereof and a monomer having a hydroxyl group in a molecule thereof, and an acrylic polymer (referred to as an "acrylic polymer (B)") having a weight average molecular weight of 1,000 to 30,000.

The pressure-sensitive adhesive sheet of the present invention may be a double-sided pressure-sensitive adhesive sheet having pressure-sensitive adhesive layer surfaces on both surfaces of the sheet, or a single-sided pressure-sensitive adhesive sheet having a pressure-sensitive adhesive layer surface on only one surface of the sheet. Among them, the double-sided pressure-sensitive adhesive sheet is preferable from the viewpoint of laminating two members. In this specification, the "pressure-sensitive adhesive sheet" also includes a tape shaped sheet, that is, a 'pressure-sensitive adhesive tape'. In this specification, a surface of the pressure-sensitive adhesive layer may be called a 'pressure-sensitive adhesive surface' in some cases.

The pressure-sensitive adhesive sheet of the present invention may be a "substrateless type pressure-sensitive adhesive sheet" (hereinafter referred to as "substrateless pressure-sensitive adhesive sheet" in some cases) that does not have a substrate (substrate layer), or may be a pressure-sensitive adhesive sheet with a substrate. The substrateless pressure-sensitive adhesive sheet may be, for example, a double-sided pressure-sensitive adhesive sheet consisting of the pressure-sensitive adhesive layer of the present invention, a double-sided pressure-sensitive adhesive sheet including the pressure-sensitive adhesive layer of the present invention and a pressure-sensitive adhesive layer other than the pressure-sensitive adhesive layer of the present invention (hereinafter, also referred to as "other pressure-sensitive adhesive layer" in some cases), and the like. On the other hand, the pressure-sensitive adhesive sheet with a substrate may be, for example, a pressure-sensitive adhesive sheet including the pressure-sensitive adhesive layer of the present invention on at least one side of the substrate, and the like. Among the pressure-sensitive adhesive sheets, from the viewpoint of making thinner or improving optical properties such as transparency, the substrateless pressure-sensitive adhesive sheet (substrateless double-sided pressure-sensitive adhesive sheet) is preferable, and the substrateless double-sided pressure-sensitive adhesive sheet consisting of the pressure-sensitive adhesive layer of the present invention is more preferable. In the "substrate (substrate layer)", a separator (release liner) to be released when the pressure-sensitive adhesive sheet is used (laminated) is not included.

(Pressure-Sensitive Adhesive Layer of the Present Invention)

The pressure-sensitive adhesive layer of the present invention is a pressure-sensitive adhesive layer (acrylic pressure-sensitive adhesive layer) formed from a pressure-sensitive adhesive composition (acrylic pressure-sensitive adhesive composition) including an acrylic polymer (A) and an acrylic polymer (B) as essential constituent components (essential components). The acrylic polymer (A) may be used either alone or in combination of two or more thereof, and the acrylic polymer (B) may be used either alone or in combination of two or more thereof. The pressure-sensitive adhesive composition preferably includes a solvent, and may further include a crosslinking agent or other various additives as necessary.

The sum of the contents (total content) of the acrylic polymer (A) and the acrylic polymer (B) in the pressure-sensitive adhesive composition is not particularly limited, but is preferably 50 wt % to 99 wt %, and more preferably 80 wt % to 98 wt % based on nonvolatile matter (100 wt %) of the pressure-sensitive adhesive composition, from the viewpoint of a pressure-sensitive adhesive property at a high temperature and an appearance property at a high-temperature and high-humidity condition.

(Acrylic Polymer (A))

The acrylic polymer (A), as a polymer formed from a component including acrylic monomers as an essential monomer component, is formed from a component including a monomer having a nitrogen atom in a molecule thereof and a monomer having a hydroxyl group in a molecule thereof, as essential monomer components. It is preferred that in the acrylic polymer (A), the component forming the acrylic polymer (A) further includes alkyl(meth)acrylate having a linear or branched alkyl group. In this specification, the "(meth)acryl" represents "acryl" and/or "methacryl" (any one or both of "acryl" and "methacryl"), and the same also applies to the others.

The monomer having a nitrogen atom in a molecule thereof has one or more nitrogen atoms in its molecule (in one molecule thereof). In this specification, the "monomer having a nitrogen atom in a molecule thereof" is called a "nitrogen atom-containing monomer" in some cases.

More particularly, examples of the nitrogen atom-containing monomer include N-vinyl cyclic amide represented by the following formula (1), (meth)acryl amides, and the like.

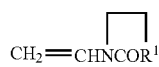

(1)

(In the formula (1), $R^1$ represents a divalent organic group)

The nitrogen atom-containing monomer may be used either alone or in combination of two or more thereof.

In the formula (1), $R^1$ is a divalent organic group, preferably a divalent saturated hydrocarbon group or a divalent unsaturated hydrocarbon group, and more preferably a divalent saturated hydrocarbon group (for example, an alkylene group having 3 to 5 carbon atoms and the like).

Examples of the N-vinyl cyclic amide represented by the formula (1) include N-vinyl-2-pyrrolidone, N-vinyl-2-piperidone, N-vinyl-3-morpholinone, N-vinyl-2-caprolactam, N-vinyl-1,3-oxazine-2-one, N-vinyl-3,5-morpholine dione, and the like.

Examples of the (meth)acrylamides include (meth)acrylamide, N-alkyl(meth)acrylamide, N,N-dialkyl(meth)acrylamide and the like. Examples of the N-alkyl(meth)acrylamide include N-ethyl(meth)acrylamide, N-isopropyl(meth)acrylamide, N-n-butyl(meth)acrylamide, N-octyl acrylamide and the like. Examples of the N-alkyl(meth)acrylamide also include (meth)acrylamide having an amino group, such as dimethylaminoethyl(meth)acrylamide, diethylaminoethyl(meth)acrylamide and dimethylaminopropyl(meth)acrylamide. Examples of the N,N-dialkyl(meth)acrylamide include N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, N,N-di(t-butyl)(meth)acrylamide and the like.

The (meth)acrylamides also includes various N-hydroxyalkyl(meth)acrylamides. Examples of the N-hydroxyalkyl(meth)acrylamides include N-methylol(meth)acrylamide, N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, N-(4-hydroxybutyl)(meth)acrylamide, N-methyl-N-2-hydroxyethyl(meth)acrylamide and the like.

The (meth)acrylamides also includes various N-alkoxyalkyl(meth)acrylamides. Examples of the N-alkoxyalkyl(meth)acrylamide include N-methoxymethyl(meth)acrylamide, N-butoxymethyl(meth)acrylamide and the like.

Examples of the nitrogen atom-containing monomer other than the N-vinyl cyclic amide and the (meth)acrylamides include an amino group-containing monomer such as aminoethyl(meth)acrylate, dimethylaminoethyl(meth)acrylate, dimethylaminopropyl(meth)acrylate and t-butylaminoethyl (meth)acrylate; a cyano group-containing monomer such as acrylonitrile and methacrylonitrile; a heterocyclic ring-containing monomer such as (meth)acryloyl morpholine, N-vinylpiperazine, N-vinylpyrrole, N-vinylimidazole, N-vinylpyrazine, N-vinylmorpholine, N-vinylpyrazole, vinylpyridine, vinylpyrimidine, vinyloxazole, vinylisoxazole, vinylthiazole, vinylisothiazole, vinylpyridazine, (meth)acryloyl pyrrolidone, (meth)acryloyl pyrrolidine, (meth)acryloyl piperidine and N-methylvinylpyrrolidone; an imide group-containing monomer including a maleimide-based monomer such as N-cyclohexylmaleimide, N-isopropylmaleimide, N-laurylmaleimide and N-phenylmaleimide, an itaconimide-based monomer such as N-methylitaconimide, N-ethylitaconimide, N-butylitaconimide, N-octylitaconimide, N-2-ethylhexylitaconimide, N-laurylitaconimide and N-cyclohexylitaconimide, a succinimide-based monomer such as N-(meth)acryloyloxymethylene succinimide, N-(meth)acryloyl-6-oxyhexamethylene succinimide and N-(meth)acryloyl-8-oxyoctamethylene succinimide; an isocyanate group-containing monomer such as 2-(meth)acryloyloxyethyl isocyanate; and the like.

Among them, from the viewpoint of suppressing the whitening due to humidification of the pressure-sensitive adhesive sheet and improving the anti-foaming release property, as the nitrogen atom-containing monomer, N-vinyl cyclic amide represented by the formula (1) and (meth)acrylamides are preferable, N-vinyl-2-pyrrolidone (NVP), N-vinyl-2-caprolactam, N,N-dimethyl(meth)acrylamide and N,N-diethyl(meth)acrylamide are more preferable, and N-vinyl-2-pyrrolidone is even more preferable.

The content (used amount) of the nitrogen atom-containing monomer constituting the acrylic polymer (A) is not particularly limited, but is preferably 1 wt % to 30 wt %, more preferably 3 wt % to 25 wt %, even more preferably 3 wt % to 20 wt %, and particularly preferably 5 wt % to 15 wt %, based on the total amount (100 wt %) of monomer components forming the acrylic polymer (A). By setting the content of the nitrogen atom-containing monomer to 1 wt % or more, the anti-foaming release property tends to be improved. The whitening of the pressure-sensitive adhesive sheet due to humidification tends to be suppressed. On the other hand, by setting the content of the nitrogen atom-containing monomer to 30 wt % or less, the pressure-sensitive adhesive layer tends to have proper softness and pressure-sensitive adhesive force or step absorbability (a property capable of burying the step on the surface of the adherend) tends to be improved.

The monomer having a hydroxyl group in a molecule thereof has one or more hydroxyl groups in its molecule (in one molecule thereof). However, in the monomer having a hydroxyl group in a molecule thereof, the nitrogen atom-containing monomer is not included (that is, in this specification, the monomer having both a nitrogen atom and a hydroxyl group in a molecule thereof is included in the "nitrogen atom-containing monomer"). In this specification, the "monomer having a hydroxyl group in a molecule thereof" is called a "hydroxyl group-containing monomer" in some cases.

Examples of the hydroxyl group-containing monomer include hydroxyl group-containing (meth)acrylate, such as 2-hydroxyethyl(meth)acrylate, 3-hydroxypropyl(meth)acrylate, 4-hydroxybutyl(meth)acrylate, 6-hydroxyhexyl(meth)acrylate, hydroxyoctyl(meth)acrylate, hydroxydecyl(meth)acrylate, hydroxylauryl(meth)acrylate and (4-hydroxymethylcyclohexyl) (meth)acrylate; vinyl alcohol, allyl alcohol and the like. The hydroxyl group-containing monomer may be used either alone or in combination of two or more thereof. Among them, as the hydroxyl group-containing monomer, hydroxyl group-containing (meth)acrylate is preferable, and 2-hydroxyethyl acrylate (HEA) and 4-hydroxybutyl acrylate (4HBA) are more preferable.

The content (used amount) of the hydroxyl group-containing monomer constituting the acrylic polymer (A) is not particularly limited, but is preferably 10 wt % to 50 wt %, more preferably 15 wt % to 40 wt %, even more preferably 15 wt % to 35 wt %, and particularly preferably 18 wt % to 30 wt %, based on the total amount (100 wt %) of monomer components forming the acrylic polymer (A). By setting the content of the hydroxyl group-containing monomer to 10 wt % or more, the whitening of the pressure-sensitive adhesive sheet due to humidification tends to be suppressed. Particularly, by setting the content of the hydroxyl group-containing monomer to 20 wt % or more, higher anti-white turbidity can be exhibited. On the other hand, by setting the content of the hydroxyl group-containing monomer to 50 wt % or less, the monomer components forming the acrylic polymer (A) tend to be easily polymerized. The proper cohesion force tends to be provided even under a high-humidity environment and cohesive failure tends to hardly occur under the high-humidity environment.

As the alkyl(meth)acrylate having the linear or branched alkyl group (hereinafter, simply referred to as "alkyl(meth)acrylate in some cases), examples thereof include alkyl(meth)acrylate having 1 to 20 carbon atoms such as methyl(meth)acrylate, ethyl(meth)acrylate, propyl(meth)acrylate, isopropyl(meth)acrylate, butyl(meth)acrylate (n-butyl(meth)acrylate, isobutyl(meth)acrylate, s-butyl(meth)acrylate, t-butyl(meth)acrylate), pentyl(meth)acrylate, isopentyl(meth)acrylate, hexyl(meth)acrylate, heptyl(meth)acrylate, octyl (meth)acrylate, 2-ethylhexyl(meth)acrylate, isooctyl(meth)acrylate, nonyl(meth)acrylate, isononyl(meth)acrylate, decyl (meth)acrylate, isodecyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl (meth)acrylate, nonadecyl(meth)acrylate and eicosyl(meth)acrylate. The alkyl(meth)acrylate may be used either alone or in combination of two or more thereof. Among them, arkyl (meth)acrylate having 1 to 4 carbon atoms is preferable, and methyl methacrylate (MMA), butyl acrylate (BA) and 2-ethylhexyl acrylate (2EHA) are more preferable.

The content (used amount) of the alkyl(meth)acrylate constituting the acrylic polymer (A) is not particularly limited, but from the viewpoint of a low-temperature adhesion property, the content of the alkyl(meth)acrylate is preferably 30 wt % to 89 wt %, more preferably 50 to 80 wt %, and even more preferably 55 wt % to 70 wt %, based on the total amount (100 wt %) of monomer components forming the acrylic polymer (A).

In the alkyl(meth)acrylate, particularly, the content (used amount) of methyl methacrylate (MMA) is not particularly limited, but is preferably 1 wt % to 50 wt %, more preferably 5 wt % to 30 wt %, and even more preferably 7 wt % to 20 wt %, based on the total amount (100 wt %) of monomer components forming the acrylic polymer (A). By setting the content of the MMA to 1 wt % or more, the anti-foaming release property (particularly, an adhesion property to the adherend made of an acryl resin or polycarbonate) tends to be improved. On the other hand, by setting the content of the MMA to 50 wt % or less, the pressure-sensitive adhesive layer tends to have proper softness, and its pressure-sensitive adhesive force or step absorbability tends to be improved.

It is preferred that as the monomer component forming the acrylic polymer (A), a monomer having a carboxyl group in its molecule (in one molecule thereof) (referred to as a "carboxyl group-containing monomer" in some cases) is not substantially included. In the case where the carboxyl group-containing monomer is not substantially included, even when the pressure-sensitive adhesive sheet of the present invention is laminated to a metallic adherend such as a metal thin film or a metal oxide thin film (for example, ITO and the like), the above adherend is hardly corroded and a conductive property of a conductive film such as an ITO film is hardly deteriorated.

The expression "substantially not included" means that it is not actively mixed, except for the case of being inevitably incorporated. In detail, the content (used amount) of the carboxyl group-containing monomer is preferably less than 0.05 wt % (for example, 0 wt % or more and less than 0.05 wt %), more preferably less than 0.01 wt %, and even more preferably less than 0.001 wt %, based on the total amount (100 wt %) of monomer components forming the acrylic polymer (A). Examples of the carboxyl group-containing monomer include (meth)acrylate, itaconic acid, maleic acid, fumaric acid, crotonic acid, isocrotonic acid and the like. Examples of the carboxyl group-containing monomer also include an acid anhydride group-containing monomer such as maleic anhydride and itaconic anhydride.

In the monomer components forming the acrylic polymer (A), in addition to the aforementioned nitrogen atom-containing monomer, the hydroxyl group-containing monomer and the alkyl(meth)acrylate, a monomer (copolymerizable monomer) which can be copolymerized with those monomers may also be included. Examples of the copolymerizable monomer in the acrylic polymer (A) include alkoxyalkyl(meth)acrylate [for example, 2-methoxyethyl(meth)acrylate, 2-ethoxyethyl (meth)acrylate, methoxytriethylenenglycol(meth)acrylate, 3-methoxypropyl(meth)acrylate, 3-ethoxypropyl(meth)acrylate, 4-methoxybutyl(meth)acrylate, 4-ethoxybutyl (meth)acrylate and the like]; an epoxy group-containing monomer [for example, glycidyl(meth)acrylate, methylglycidyl(meth)acrylate and the like]; a sulfonate group-containing monomer [for example, sodium vinyl sulfonate and the like]; a phosphate group-containing monomer; (meth)acrylate having an alicyclic hydrocarbon group [for example, cyclopentyl(meth)acrylate, cyclohexyl(meth)acrylate, isobornyl(meth)acrylate and the like]; (meth)acrylate having an aromatic hydrocarbon group [for example, phenyl(meth)acrylate, phenoxyethyl(meth)acrylate, benzyl(meth)acrylate and the like]; viny esters [for example, vinyl acetate, vinyl propionate and the like]; an aromatic vinyl compound [for example, styrene, vinyl toluene and the like]; olefins or dienes [for example, ethylene, propylene, butadiene, isoprene, isobutylene and the like]; vinyl ethers [for example, vinyl alkyl ether and the like]; vinyl chloride, and the like.

As the copolymerizable monomer in the acrylic polymer (A), a polyfunctional monomer may also be used. As the polyfunctional monomer, examples thereof include hexanediol di(meth)acrylate, butanediol di(meth)acrylate, (poly) ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, vinyl(meth)acrylate, divinylbenzene, epoxyacrylate, polyester acrylate and urethane acrylate. The polyfunctional monomer may be used either alone or in combination of two or more thereof.

The content (used amount) of the polyfunctional monomer constituting the acrylic polymer (A) is not particularly limited, but is preferably 0.5 wt % or less (for example, 0 wt % to 0.5 wt %) and more preferably 0 wt % to 0.1 wt % based on the total amount (100 wt %) of monomer components forming the acrylic polymer (A). By setting the content of the polyfunctional monomer to 0.5 wt % or less, the pressure-sensitive adhesive layer tends to have proper cohesive force and the pressure-sensitive adhesive force or step absorbability tends to be improved. In the case of using a crosslinking agent, the polyfunctional monomer may not be used, but in the case where the crosslinking agent is not used, the content of the polyfunctional monomer is preferably 0.001 wt % to 0.5 wt % and more preferably 0.002 wt % to 0.1 wt %.

The acrylic polymer (A) is an acrylic polymer formed from a component including a nitrogen atom-containing monomer and a hydroxyl group-containing monomer as essential monomer components. Among them, the acrylic polymer (A) is preferably an acrylic polymer formed from a component including a nitrogen atom-containing monomer, a hydroxyl group-containing monomer and alkyl(meth)acrylate as essential monomer components, and as the particularly preferable detailed aspect, examples thereof include an acrylic polymer formed from a component including [1] N-vinyl-2-pyrrolidone, [2] 2-hydroxyethyl acrylate and/or 4-hydroxybutyl acrylate, [3] 2-ethylhexyl acrylate and/or butyl acrylate, and [4] methyl methacrylate, as essential monomer components. In the acrylic polymer (A) of the particularly preferable detailed aspect, it is preferred that the content of the [1] N-vinyl-2-pyrrolidone is 5 wt % to 15 wt %, the content of the [2] 2-hydroxyether acrylate and 4-hydroxybutyl acrylate (the total amount thereof in the case of including both of them) is 20 wt % to 26 wt %, the content of the [3] 2-ethylhexyl acrylate and butyl acrylate (the total amount thereof in the case of including both of them) is 52 wt % to 65 wt %, and the content of the [4] methyl methacrylate is 8 wt % to 15 wt %, based on the total amount (100 wt %) of monomer components forming the acrylic polymer (A). However, the acrylic polymer (A) is not limited to the above detailed aspect.

The acrylic polymer (A) is an acrylic polymer including a structural unit derived from the nitrogen atom-containing monomer and a structural unit derived from the hydroxyl group-containing monomer as essential structural units. The content of the structural unit derived from the nitrogen atom-containing monomer in the acrylic polymer (A) is preferably 1 wt % to 30 wt %, more preferably 3 wt % to 25 wt %, even more preferably 3 wt % to 20 wt %, and particularly preferably 5 wt % to 15 wt %. The content of the structural unit derived from the hydroxyl group-containing monomer in the acrylic polymer (A) is preferably 10 wt % to 50 wt %, more preferably 15 wt % to 40 wt %, even more preferably 15 wt % to 35 wt %, and particularly preferably 18 wt % to 30 wt %. It is preferred that the acrylic polymer (A) further includes a structural unit derived from alkyl(meth)acrylate having a linear or branched alkyl group.

As a particularly preferably detailed aspect of the acrylic polymer (A), examples thereof include an acrylic polymer including [1] a structural unit derived from N-vinyl-2-pyrrolidone, [2] a structural unit derived from 2-hydroxyethyl acrylate and/or a structural unit derived from 4-hydroxybutyl acrylate, [3] a structural unit derived from 2-ethylhexyl acrylate and/or a structural unit derived from butyl acrylate, and [4] a structural unit derived from methyl methacrylate, as essential structural units. In the acrylic polymer (A) of the particularly preferably detailed aspect, it is preferred that the content of [1] the structural unit derived from N-vinyl-2-pyrrolidone is 5 wt % to 15 wt %, the content of [2] the structural unit derived from 2-hydroxyethyl acrylate and the structural unit derived from 4-hydroxybutyl acrylate (the total amount thereof in the case of including both of them) is 20 wt % to 26 wt %, the content of [3] the structural unit derived from 2-ethylhexyl acrylate and the structural unit derived from butyl acrylate (the total amount thereof in the case of including both of them) is 52 wt % to 65 wt %, and the content of [4] the structural unit derived from methyl methacrylate is 8 wt % to 15 wt %. However, the acrylic polymer (A) is not limited to the above detailed aspect.

The acrylic polymer (A) can be prepared by polymerizing the monomer components using a known/general polymerization method. As the polymerization method of the acrylic polymer (A), examples thereof include a solution polymerization method, an emulsion polymerization method, a bulk polymerization method and a polymerization method by an active energy-ray irradiation (active energy-ray polymerization method). Among them, from the standpoint of transparency, water resistance and cost of the pressure-sensitive adhesive layer, the solution polymerization method and the active energy-ray polymerization method are preferable, and the solution polymerization method is more preferable.

In the polymerization of the acrylic polymer (A), various kinds of general solvents can be used. Examples of such a solvent include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

In the polymerization of the acrylic polymer (A), a polymerization initiator such as a thermal polymerization initiator or a photopolymerization initiator (photoinitiator) may be used depending on a kind of polymerization reaction. The polymerization initiator may be used either alone or in combination of two or more thereof.

Examples of the thermal polymerization initiator include an azo-based initiator, a peroxide-based polymerization initiator (for example, dibenzoyl peroxide, tert-butylpermaleate and the like), a redox-based polymerization initiator and the like. Among the initiators, an azo-based initiator as disclosed in JP 2002-69411 A is particularly preferable. The azo-based initiator is preferable because the decomposed product of the initiator hardly remains in the acrylic polymer as a part which causes a gas generated by heat (outgas). As the azo-based initiator, examples thereof include 2,2'-azobisisobutyronitrile (AIBN), 2,2'-azobis-2-methylbutyronitrile (AMBN), dimethyl 2,2'-azobis(2-methylpropionate), 4,4'-azobis-4-cyanovaleric acid and the like. The used amount of the azo-based initiator is preferably 0.05 parts by weight to 0.5 parts by weight, and more preferably 0.1 parts by weight to 0.3 parts by weight, based on 100 parts by weight of the total amount of the monomer components forming the acrylic polymer (A).

The weight average molecular weight (Mw) of the acrylic polymer (A) is 100,000 to 3,000,000, preferably 300,000 to 1,500,000, and more preferably 500,000 to 1,100,000. By setting the weight average molecular weight of the acrylic polymer (A) to 100,000 or more, the anti-foaming release property is improved. On the other hand, by setting the weight average molecular weight of the acrylic polymer (A) to 3,000, 000 or less, the acrylic polymer (A) is easily polymerized or the pressure-sensitive adhesive composition is easily coated.

The weight average molecular weight of the acrylic polymer (A) can be measured by a gel permeation chromatography (GPC) method. In more detail, the weight average molecular weight of the acrylic polymer can be measured by using a GPC measuring device, a trade name of "HLC-8120 GPC" (manufactured by Tosoh Corporation) under the following measuring condition, and then, calculating with a standard polystyrene conversion value.

(Conditions for Measuring Molecular Weight)

Sample concentration: About 2.0 g/L (tetrahydrofuran solution)

Sample dosage: 20 μL

Column: trade name "TSK gel, Super AWM-H+ super AW 4000+ super AW 2500" (manufactured by Tosoh Corporation)

Column size: each 6.0 mm I.D.×150 mm

Eluent: tetrahydrofuran (THF)

Flow rate: 0.4 mL/min

Detector: Refractive Index (RI)

Column temperature (measuring temperature): 40° C.

The molecular weight distribution (Mw/Mn) of the acrylic polymer (A) is not particularly limited, but is preferably 1.0 to 20.0, more preferably 1.0 to 15.0, and even more preferably 1.0 to 10.0. By setting the molecular weight distribution of the acrylic polymer (A) to 20.0 or less, the anti-foaming release property tends to be improved. A coating property tends to be improved. The molecular weight distribution can be calculated based on the measured result of the molecular weight by the above GPC method.

The glass transition temperature (Tg) of the acrylic polymer (A) is not particularly limited, but is preferably −80° C. to 20° C., more preferably −60° C. to 0° C., and even more preferably −50° C. to −10° C. By setting the glass transition temperature (Tg) of the acrylic polymer (A) to 20° C. or less, the pressure-sensitive adhesive layer tends to have proper flexibility, and its pressure-sensitive adhesive force or the step absorbability tends to be improved.

The glass transition temperature (Tg) of the acrylic polymer (A) is a glass transition temperature (theoretical value) represented by the following equation.

$$1/Tg = W_1/Tg_1 + W_2/Tg_2 + \ldots + W_n/Tg_n$$

In the above equation, Tg represents a glass transition temperature (unit: K) of the acrylic polymer (A), $Tg_i$ represents a glass transition temperature (unit: K) when a monomer i forms a homopolymer, and $W_i$ represents a weight fraction of the monomer i (i=1, 2, . . . , n) in the entire monomer components. The equation is used when the acrylic polymer (A) is configured by n kinds of monomer components such as monomer 1, monomer 2, . . . , monomer n.

In this specification, a "glass transition temperature (Tg) when forming a homopolymer" (briefly, also referred to as a "glass transition temperature (Tg) of a homopolymer" in some cases) refers to a "glass transition temperature (Tg) of a single polymer of the monomer". The Tg of a copolymer, which is calculated by the above equation by using values of the Tg of a homopolymer of a representative polymer forming the acrylic polymer (A) and the acrylic polymer (B) of the present invention and the Tg of the above homopolymer, is shown in Table 1. In Table 1, "DCPMA/MMA60" refers to "a copolymer having 40 parts by weight of DCPMA and 60 parts by weight of MMA".

TABLE 1

| | Composition | Tg [° C.] |
|---|---|---|
| Homopolymer | Methyl methacrylate (MMA) | 105 |
| | Dicyclopentanyl methacrylate (DCPMA) | 175 |
| | Dicyclopentanyl acrylate (DCPA) | 120 |
| | Isobornyl methacrylate (IBXMA) | 173 |
| | Isobornylacrylate (IBXA) | 97 |
| | Cyclohexyl methacrylate (CHMA) | 66 |
| | 1-adamantyl methacrylate (ADMA) | 250 |
| | 1-adamantyl acrylate (ADA) | 153 |
| Copolymer | DCPMA/MMA60 | 130 |

As the Tg of a homopolymer of a monomer which is not listed in Table 1, for example, a value disclosed in the "Polymer Handbook" ($3^{rd}$ edition, John Wiley & Sons, Inc., 1989) can be adopted. As the Tg of a homopolymer of a monomer which is not disclosed even in the above literature, for example, a value obtained by the following measuring method (see JP 2007-51271 A) can be adopted. That is, 100 parts by weight of a monomer, 0.2 part by weight of azobisisobutyronitrile, and 200 parts by weight of ethyl acetate as a polymerization solvent, are put into a reactor provided with a thermometer, an agitator, a nitrogen introducing tube and a reflux cooling tube, followed by stirring for 1 hour while nitrogen gas is introduced thereto. After oxygen in the polymerization system is removed thereby, the system is heated to 63° C., followed by reacting for 10 hours. Subsequently, the system is cooled to room temperature, thereby obtaining a homopolymer solution having a solid matter concentration of 33 wt %. Thereafter, the homopolymer solution is cast-coated on a release liner, followed by drying to prepare a test sample (sheet-shaped homopolymer) having a thickness of about 2 mm. The test sample is pierced in a disk shape having a diameter of 7.9 mm, and the pieced test samples is inserted to a parallel plate and then viscoelasticity thereof is measured by a shear mode at a temperature-rising rate of 5° C./min in the temperature range of −70° C. to 150° C. while applying shear distortion of a frequency of 1 Hz by using a viscoelasticity tester (ARES, manufactured by Reomatrix Corporation) and a peaktop temperature of tan δ is set as Tg of the homopolymer.

(Acrylic Polymer (B))

The acrylic polymer (B), as a polymer formed from a component including acrylic monomer as an essential monomer component, is an acrylic polymer having a weight average molecular weight of 1,000 to 30,000. Because the pressure-sensitive adhesive layer is formed from the pressure-sensitive adhesive composition including the acrylic polymer (B) as an essential component, the pressure-sensitive adhesive layer of the present invention exhibits an excellent anti-foaming release property.

Particularly, the acrylic polymer (B) is preferably formed from a component including (meth)acrylate having a cyclic structure in a molecule thereof as an essential monomer component, from the viewpoint of improving the anti-foaming release property. In the acrylic polymer (B), the component forming the acrylic polymer (B) preferably further includes alkyl(meth)acrylate having a linear or branched alkyl group as an essential monomer component.

The cyclic structure (ring) of the (meth)acrylate having the cyclic structure in its molecule (in one molecule thereof) (hereinafter, referred to as a "ring-containing (meth)acrylate" in some cases) may be any one of an aromatic ring and a non-aromatic ring, and is not particularly limited. As the aromatic ring, examples thereof include an aromatic carbon ring [for example, a monocyclic carbon ring such as a benzene ring, a condensed carbon ring such as a naphthalene ring], various aromatic heterocyclic rings, and the like. As the non-aromatic ring, examples thereof include a non-aromatic aliphatic ring (non-aromatic alicyclic ring) [for example, a cycloalkane ring such as a cyclopentane ring, a cyclohexane ring, a cycloheptane ring and a cyclooctane ring; a cycloalkene ring such as a cyclohexene ring], a non-aromatic crosslinking ring [for example, a bicyclic hydrocarbon ring such as pinane, pinene, bornane, norbornane and norbornene; a tri- or multi-cyclic aliphatic hydrocarbon ring (crosslinking hydrocarbon ring) such as adamantane], a nonaromatic heterocyclic ring [for example, an epoxy ring, an oxolan ring, an oxetane ring and the like], and the like.

As the tri- or multi-cyclic aliphatic hydrocarbon ring (tri- or multi-cyclic crosslinking hydrocarbon ring), examples thereof include a dicyclopentanyl group represented by the following formula (2a), a dicyclopentenyl group represented by the following formula (2b), an adamantyl group represented by the following formula (2c), a tricyclopentanyl group represented by the following formula (2d), a tricyclopentenyl group represented by the following formula (2e), and the like.

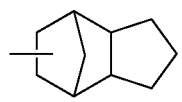
(2a)

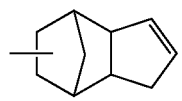
(2b)

(2c)

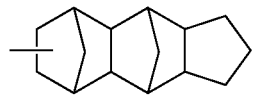
(2d)

(2e)

That is, as the ring-containing (meth)acrylate, examples thereof include cycloalkyl(meth)acrylate such as cyclopentyl (meth)acrylate, cyclohexyl(meth)acrylate, cycloheptyl (meth)acrylate and cyclooctyl(meth)acrylate; (meth)acrylate having a bicyclic aliphatic hydrocarbon ring such as isobornyl(meth)acrylate; (meth)acrylate having a tricyclic aliphatic hydrocarbon ring such as dicyclopentanyl(meth) acrylate, dicyclopentanyloxyethyl(meth)acrylate, tricyclopentanyl(meth)acrylate, 1-adamantyl(meth)acrylate, 2-methyl-2-adamantyl(meth)acrylate and 2-ethyl-2-adamantyl (meth)acrylate; (meth)acrylate having an aromatic ring including aryl(meth)acrylate such as phenyl(meth)acrylate, aryloxyalkyl(meth)acrylate such as phenoxyethyl(meth) acrylate, arylalkyl(meth)acrylate such as benzyl(meth)acrylate. The ring-containing (meth)acrylate may be used either alone or in combination of two or more thereof. Among them, as the ring-containing (meth)acrylate, non-aromatic ring-containing (meth)acrylate is preferable, cyclohexyl acrylate (CHA), cyclohexyl methacrylate (CHMA), dicyclopentanyl acrylate (DCPA) and dicyclopetanyl methacrylate (DCPMA) are more preferable, and dicyclopentanyl acrylate (DCPA) and dicyclopentanyl methacrylate (DCPMA) are even more preferable.

Among the non-aromatic ring-containing (meth)acrylates, in the case where the (meth)acrylate having a tri- or multi-cyclic aliphatic hydrocarbon ring (particularly, tri- or multi-cyclic crosslinking hydrocarbon ring) is used, particularly, from the viewpoint of hardly causing polymerization inhibition, by using (meth)acrylate having the dicyclopentanyl group represented by the formula (2a), the adamantyl group represented by the formula (2c), and the tricyclopentanyl group represented by the formula (2d), which do not have an unsaturated bond, the anti-foaming release property can be more increased, and the adhesive property to a low-polarity adherend such as polyethylene or polypropylene can be largely improved.

The content (used amount) of the ring-containing (meth) acrylate constituting the acrylic polymer (B) is not particularly limited, but is preferably 10 wt % to 90 wt % and more preferably 20 wt % to 80 wt %, based on the total amount (100 wt %) of monomer components forming the acrylic polymer (B). By setting the content of the ring-containing (meth) acrylate to 10 wt % or more, the anti-foaming release property tends to be improved. On the other hand, by setting the content thereof to 90 wt % or less, the pressure-sensitive adhesive layer tends to have proper flexibility and the pressure-sensitive adhesive force or the step absorbability tends to be improved.

As the alkyl(meth)acrylate having the linear or branched alkyl group constituting the acrylic polymer (B), examples thereof include alkyl(meth)acrylate having an alkyl group having 1 to 20 carbon atoms, such as methyl(meth)acrylate, ethyl(meth)acrylate, propyl(meth)acrylate, isopropyl(meth) acrylate, butyl(meth)acrylate, isobutyl(meth)acrylate, s-butyl(meth)acrylate, t-butyl(meth)acrylate, pentyl(meth)acrylate, isopentyl(meth)acrylate, hexyl(meth)acrylate, heptyl (meth)acrylate, octyl(meth)acrylate, 2-ethylhexyl(meth) acrylate, isooctyl(meth)acrylate, nonyl(meth)acrylate, isononyl(meth)acrylate, decyl(meth)acrylate, isodecyl (meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl (meth)acrylate, octadecyl(meth)acrylate, nonadecyl(meth) acrylat and eicosyl(meth)acrylate. The alkyl(meth)acrylate may be used either alone or in combination of two or more thereof. Among the alkyl(meth)acrylates, methyl methacrylate (MMA) is preferable from the viewpoint of improving compatibility with the acrylic polymer (A).

The content (used amount) of the alkyl(meth)acrylate having a linear or branched alkyl group constituting the acrylic polymer (B) is not particularly limited, but from the viewpoint of the anti-foaming release property, the content is preferably 10 wt % to 90 wt %, more preferably 20 wt % to 80 wt %, and even more preferably 20 wt % to 60 wt %, based on the total amount (100 wt %) of monomer components forming the acrylic polymer (B). By setting the content of the alkyl(meth)acrylate having a linear or branched alkyl group to 10 wt % or more, particularly, the pressure-sensitive adhesive property to an adherend made of an acrylic resin or polycarbonate tends to be improved.

The monomer components forming the acrylic polymer (B) may include, in addition to the ring-containing (meth) acrylate and the alkyl(meth)acrylate having a linear or branched alkyl group, a monomer (copolymerizable monomer) which can be copolymerized with those monomers as well. The content (used amount) of the copolymerizable monomer is preferably 49.9 wt % or less (for example, 0 wt % to 49.9 wt %) and more preferably 30 wt % or less, based on the total amount (100 wt %) of monomer components forming the acrylic polymer (B).

As the copolymerizable monomer constituting the acrylic polymer (B), examples thereof include alkoxyalkyl(meth) acrylate [for example, 2-methoxyethyl(meth)acrylate, 2-ethoxyethyl(meth)acrylate, methoxytriethyleneglycol (meth)acrylate, 3-methoxypropyl(meth)acrylate, 3-ethoxypropyl(meth)acrylate, 4-methoxybutyl(meth)acrylate, 4-ethoxybutyl(meth)acrylate and the like]; a carboxyl group-containing monomer [for example, (meth)acrylate, itaconic acid, maleic acid, fumaric acid, crotonic acid, isocrotonic acid, and an acid anhydride group-containing monomer such as maleic anhydride]; a hydroxyl group-containing monomer [for example, hydroxyalkyl(meth)acrylate such as 2-hydroxyethyl(meth)acrylate, 3-hydroxypropyl(meth)acrylate, 4-hydroxybutyl(meth)acrylate and 6-hydroxyhexyl(meth) acrylate, vinylalcohol, allylalcohol and the like]; an amide group-containing monomer [for example, (meth)acrylamide, N,N-dimethyl(meth)acrylamide, N-methylol(meth)acrylamide, N-methoxymethyl(meth)acrylamide, N-butoxymethyl (meth)acrylamide, N-hydroxyethyl(meth)acrylamide and the like]; an amino group-containing monomer [for example, aminoethyl(meth)acrylate, dimethylaminoethyl(meth)acrylate, t-butylaminoethyl(meth)acrylate and the like]; a cyano group-containing monomer [for example, acrylonitrile, methacrylonitrile and the like]; a sulfonate group-containing monomer [for example, sodium vinyl sulfonate and the like]; a phosphate group-containing monomer [for example, 2-hydroxyethylacryloylphophate and the like]; an isocyanate group-containing monomer [for example, 2-methacryloyloxyethyl isocyanate and the like], an imide group-containing monomer [for example, cyclohexyl maleimide, isopropyl maleimide and the like], and the like.

The acrylic polymer (B) is preferably formed from a component including the ring-containing (meth)acrylate and the alkyl(meth)acrylate as essential monomer components, and as a particularly preferable detailed aspect, examples thereof include an acrylic polymer formed from a component including [1] one or more monomers selected from the group consisting of dicyclopentanyl acrylate, dicyclopentanyl methacrylate, cyclohexyl acrylate, and cyclohexyl methacrylate, and [2] methyl methacrylate, as essential monomer components. In the acrylic polymer (B) of the particularly preferable detailed aspect, it is preferred that the content of [1] dicyclopentanyl acrylate, dicyclopentanyl methacrylate, cyclohexyl acrylate and cyclohexyl methacrylate (total amount thereof in the case of including two or more kinds) is 30 wt % to 70 wt %, and the content of [2] methyl methacrylate is 30 wt % to 70 wt %, based on the total amount (100 wt %) of monomer components forming the acrylic polymer (B). However, the acrylic polymer (B) is not limited to the above detailed aspect.

It is preferred that the acrylic polymer (B) is an acrylic polymer including a structural unit derived from the ring-containing (meth)acrylate and a structural unit derived from the alkyl(meth)acrylate as essential structural units. The content of the structural unit derived from the ring-containing (meth)acrylate in the acrylic polymer (B) is preferably 10 wt % to 90 wt %, and more preferably 20 wt % to 80 wt %. The content of the structural unit derived from the alkyl(meth) acrylate in the acrylic polymer (B) is preferably 10 wt % to 90 wt %, more preferably 20 wt % to 80 wt %, and even more preferably 20 wt % to 60 wt %.

As the particularly preferable detailed aspect of the acrylic polymer (B), examples thereof include an acrylic polymer including [1] structural unit(s) derived from one or more monomers selected from the group consisting of dicyclopentanyl acrylate, dicyclopentanyl methacrylate, cyclohexyl acrylat, and cyclohexyl methacrylate, and [2] a structural unit derived from methyl methacrylate, as essential structural units. In the acrylic polymer (B) of the particularly preferable detailed aspect, it is preferred that the content (total amount thereof in the case of including two or more kinds) of [1] the structural unit derived from dicyclopentanyl acrylate, the structural unit derived from dicyclopentanyl methacrylate, the structural unit derived from cyclohexyl acrylate, and the structural unit derived from cyclohexyl methacrylate is 30 wt % to 70 wt %, and the content of the structural unit derived from [2] methyl methacrylate is 30 wt % to 70 wt %. However, the acrylic polymer (B) is not limited to the above detailed aspect.

The acrylic polymer (B) can be prepared by polymerizing the monomer components using a known and general polymerization method. As the polymerization method of the acrylic polymer (B), examples thereof include a solution polymerization method, an emulsion polymerization method, a bulk polymerization method, a polymerization method using an active energy-ray irradiation (active energy-ray polymerization method), and the like. Among them, the bulk polymerization method and the solution polymerization method are preferable, and the solution polymerization method is more preferable.

In the polymerization of the acrylic polymer (B), various kinds of general solvents may be used. As the solvents, examples thereof include organic solvents, such as esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

In the polymerization of the acrylic polymer (B), a known and general polymerization initiator can be used. In detail, as the polymerization initiator, examples thereof include an azo-based initiator such as 2,2'-azobisisobutyronitrile (AIBN), 2,2'-azobis-2-methylbutyronitrile (AMBN), dimethyl-2,2'-azobis(2-methylpropionate), 4,4'-azobis-4-cyanovalerate, 2,2'-azobis(4-methoxy-2,4-dimethylvaleronitrile), 2,2'-azobis(2,4-dimethylvaleronitrile), 1,1'-azobis(cyclohexane-1-carbonitrile) and 2,2'-azobis(2,4,4'-trimethylpentane); a peroxide-based initiator such as benzoylperoxide, t-butylhydroperoxide, di-t-butylperoxide, t-butylperoxybenzoate, dicumylperoxide, 1,1-bis(t-butylperoxy)-3,3,5-trimethylcyclohexane and 1,1-bis(t-butylperoxy)cyclododecane. In the case of the solution polymerization, it is preferred that an oil-soluble polymerization initiator is used. The polymerization initiator may be used either alone or in combination of two or more thereof. The used amount of the polymerization initiator may be a typical used amount, and for example, may be properly selected in a range of about 0.1 parts by weight to 15 parts by weight based on the total amount (100 parts by weight) of monomer components forming the acrylic polymer (B).

In the polymerization of the acrylic polymer (B), in order to control the molecular weight (in detail, in order to control the weight average molecular weight to 1,000 to 30,000), a chain-transfer agent may be used. As the chain-transfer agent, examples thereof include 2-mercaptoethanol, α-thioglycerol, 2,3-dimercapto-1-propanol, octyl mercaptane, t-nonyl mercaptane, dodecyl mercaptane (lauryl mercaptane), t-dodecyl mercaptane, glycidyl mercaptane, thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isoctyl thioglycolate, decyl thioglycolate, dodecyl thioglycolate, thioglycolic ester of ethyleneglycol, thioglycolic ester of neopentylglycol, thioglycolic ester of pentaerythritol, α-methylstyrene dimmer, and the like. The chain-transfer agents may be used either alone or in combination of two or more thereof. Among the chain-transfer agents, α-thioglycerol and methyl thioglycolate are preferable, and α-thioglycerol is more preferable, from the viewpoint of suppressing the whitening of the pressure-sensitive adhesive sheet due to humidification.

The content (used amount) of the chain-transfer agent is not particularly limited, but is preferably 0.1 parts by weight to 20 parts by weight, more preferably 0.2 parts by weight to 15 parts by weight, and even more preferably 0.3 parts by weight to 10 parts by weight, based on the total amount (100 parts by weight) of monomer components forming the acrylic polymer (B). By setting the content (used amount) of the chain-transfer agent to the above range, an acrylic polymer of which the weight average molecular weight is controlled to 1,000 to 30,000 can be easily obtained.

The weight average molecular weight (Mw) of the acrylic polymer (B) is 1,000 to 30,000, preferably 1,000 to 20,000, more preferably 1,500 to 10,000, and even more preferably 2,000 to 4,000. By setting the weight average molecular weight of the acrylic polymer (B) to 1,000 or more, the pressure-sensitive adhesive force or a maintaining property is improved, and the anti-foaming release property is improved. On the other hand, by setting the weight average molecular weight of the acrylic polymer (B) to 30,000 or less, the pressure-sensitive adhesive force is easily increased and the anti-foaming release property is improved. The weight average molecular weight of the acrylic polymer (B) can be measured by the same method as that of measuring weight average molecular weight of the acrylic polymer (A) as described above.

The glass transition temperature (Tg) of the acrylic polymer (B) is not particularly limited, but is preferably 20° C. to 300° C., more preferably 30° C. to 300° C., and even more preferably 40° C. to 300° C. By setting the glass transition temperature of the acrylic polymer (B) to 20° C. or more, the anti-foaming release property tends to be improved. On the other hand, by setting the glass transition temperature of the acrylic polymer (B) to 300° C. or less, the pressure-sensitive adhesive layer tends to have proper flexibility, and the pressure-sensitive adhesive force or step absorbability tends to be improved.

The glass transition temperature (Tg) of the acrylic polymer (B) is a glass transition temperature (theoretical value) represented by the following equation, like the aforementioned acrylic polymer (A).

$$1/Tg = W_1/Tg_1 + W_2/Tg_2 + \ldots + W_n/Tg_n$$

In the above equation, Tg represents a glass transition temperature (unit: K) of the acrylic polymer (B), $Tg_i$ represents a glass transition temperature (unit: K) when a monomer i forms a homopolymer, and $W_i$ represents a weight fraction of the monomer i in the entire monomer components (i=1, 2, . . . n).

As the Tg of the homopolymer of the monomers constituting the acrylic polymer (B), the values disclosed in Table 1 can be adopted. As described above, as the Tg of the homopolymer of the monomer which is not disclosed in Table 1, the values disclosed in the "Polymer Handbook" ($3^{rd}$ edition, John Wiley & Sons, Inc., 1989) can be adopted. As the Tg of the homopolymer of the monomer which is not disclosed even in the above literature, the values obtained by the aforementioned measuring method (peaktop temperatures of tan δ obtained by a viscoelasticity test) can be adopted.

As described above, the pressure-sensitive adhesive composition (acrylic pressure-sensitive adhesive composition) for forming the pressure-sensitive adhesive layer of the present invention includes the acrylic polymer (A) and the acrylic polymer (B) as essential components. The content of the acrylic polymer (A) in the pressure-sensitive adhesive composition is not particularly limited, but is preferably 5 wt % to 95 wt % and more preferably 10 wt % to 95 wt % based on a nonvolatile matter (100 wt %) of the pressure-sensitive adhesive composition, from the viewpoint of a pressure-sensitive adhesive property at a high temperature and an appearance property at a high-temperature and high-humidity condition.

The content of the acrylic polymer (B) in the pressure-sensitive adhesive composition is not particularly limited, but is preferably 1 part by weight to 50 parts by weight, more preferably 2 parts by weight to 20 parts by weight, even more preferably 3 parts by weight to 10 parts by weight, and particularly preferably 3 parts by weight to 9 parts by weight, based on 100 parts by weight of the acrylic polymer (A). That is, the content of the acrylic polymer (B) in the pressure-sensitive adhesive layer of the present invention is not particularly limited, but is preferably 1 part by weight to 50 parts by weight, more preferably 2 parts by weight to 20 parts by weight, even more preferably 3 parts by weight to 10 parts by weight, and particularly preferably 3 parts by weight to 9 parts by weight, based on 100 parts by weight of the acrylic polymer (A). By setting the content of the acrylic polymer (B) to 1 part by weight or more, the anti-foaming release property tends to be improved. On the other hand, by setting the content of the acrylic polymer (B) to 50 parts by weight or less, the whitening of the pressure-sensitive adhesive sheet due to humidification tends to be suppressed.

In the pressure-sensitive adhesive composition, if necessary, known additives such as a crosslinking agent, a crosslinking accelerator, a silane coupling agent, a tackifying resin (rosin derivative, polyterpene resin, petroleum resin, and oil-soluble phenol), an antiaging agent, a filler, a colorant (dye or pigment), a UV absorbing agent, an antioxidant, a chain-transfer agent, a plasticizer, a softener, a surfactant and an antistatic agent may be used as long as the property of the present invention is not impaired. When the pressure-sensitive adhesive layer of the present invention is formed, various general solvents may be used. The kind of the solvent is not particularly limited, and examples thereof include any solvents used in the solution polymerization method as described above.

By using the crosslinking agent, the acrylic polymer (particularly, acrylic polymer (A)) in the pressure-sensitive adhesive layer of the present invention can be crosslinked, and the gel fraction can be controlled. As the crosslinking agent, examples thereof include an isocyanate-based crosslinking agent, an epoxy-based crosslinking agent, a melamine-based crosslinking agent, a peroxide-based crosslinking agent, an urea-based crosslinking agent, a metal alkoxide-based crosslinking agent, a metal chelate-based crosslinking agent, a metal salt-based crosslinking agent, a carbodiimide-based crosslinking agent, an oxazoline-based crosslinking agent, an aziridine-based crosslinking agent, an amine-based crosslinking agent and the like. The crosslinking agent may be used either alone or in combination of two or more thereof. Among the above crosslinking agents, the isocyanate-based crosslinking agent and the epoxy-based crosslinking agent are preferable, and the isocyanate-based crosslinking agent is more preferable, from the viewpoint of improvement of the anti-foaming release property.

As the isocyanate-based crosslinking agent (polyfunctional isocyanate compound), examples thereof include lower aliphatic polyisocyanates such as 1,2-ethylene diisocyanate, 1,4-butylenediisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylylene diisocyanate. The isocyanate-based crosslinking agent may be, for example, commercially available products such as a trimethylolpropane/tolylene diisocyanate adduct (manufactured by Nippon Polyurethane Industry Co., Ltd., trade name "CORONATE L"), a trimethylolpropane/hexamethylene diisocyanate adduct (manufactured by Nippon Polyurethane Industry Co., Ltd., trade name "CORONATE HL"), a trimethylolpropane/xylylene diisocyanate adduct (manufactured by Mitsui Chemicals Co., Ltd., trade name "TAKENATE 110N").

As the epoxy-based crosslinking agent (polyfunctional epoxy compound), examples thereof include N,N,N',N'-tetraglycidyl-m-xylenediamine, diglycidyl aniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic diglycidyl ester, triglycidyl-tris(2-hydroxyethyl)isocyanurate, resorcin diglycidyl ether, bisphenol-S-diglycidyl ether and an epoxy-based resin having two or more epoxy groups in the molecule. The epoxy-based crosslinking agent may be, for example, commercially available products such as trade name "TETRAD C" manufactured by Mitsubishi Gas Chemical Company, Inc.

The content of the crosslinking agent in the pressure-sensitive adhesive composition is not particularly limited, but is preferably 0.001 parts by weight to 10 parts by weight, and more preferably 0.01 parts by weight to 5 parts by weight based on 100 parts by weight of the acrylic polymer (A). By setting the content of the crosslinking agent to 0.001 parts by weight or more, the anti-foaming release property tends to be improved. On the other hand, by setting the content of the crosslinking agent to 10 parts by weight or less, the pressure-sensitive adhesive layer tends to have proper flexibility, and the pressure-sensitive adhesive force tends to be improved.

The pressure-sensitive adhesive composition may include a silane coupling agent for the purpose of improving an adhesion property to glass (in particular, adhesion reliability to glass at high temperature and high humidity environment). The silane coupling agent is not particularly limited, but γ-glycidoxypropyltrimethoxysilane, γ-glycidoxypropyltriethoxysilane, γ-aminopropyltrimethoxysilane and N-phenylaminopropyltrimethoxysilane are preferably exemplified. Among them, γ-glycidoxypropyltrimethoxysilane is preferable. The silane coupling agent may be used either alone or in combination of two or more thereof. As the silane coupling agent, for example, a commercially available product such as trade name "KBM-403" (manufactured by Shin-Etsu Chemical Co., Ltd.) may be used.

The content of the silane coupling agent in the pressure-sensitive adhesive composition is preferably 0.01 parts by weight to 1 part by weight, and more preferably 0.03 parts by weight to 0.5 part by weight, based on 100 parts by weight of the acrylic polymer (A), from the viewpoint of improvement of adhesion reliability to glass under a humid environment.

The pressure-sensitive adhesive composition is not particularly limited, but can be prepared by mixing the acrylic polymer (A) (or acrylic polymer (A) solution) and the acrylic polymer (B) (or acrylic polymer (B) solution), and if necessary, a solvent, a crosslinking agent, a silane coupling agent or other additives.

The formation of the pressure-sensitive adhesive layer of the present invention is not particularly limited, but the pressure-sensitive adhesive layer can be formed by applying the pressure-sensitive adhesive composition on a substrate or a release liner and if necessary, drying and/or curing the applied pressure-sensitive adhesive composition.

In the coating of the pressure-sensitive adhesive composition, a known coating method can be used, and a general coater, for example, a gravure roll coater, a reverse roll coater, a kiss roll coater, a dip roll coater, a bar coater, a knife coater, a spray coater, a comma coater and a direct coater, can be used.

The thickness of the pressure-sensitive adhesive layer is not particularly limited, but is preferably 10 μm to 500 μm, more preferably 10 μm to 250 μm, and even more preferably 10 μm to 200 μm. By setting the thickness to 10 μm or more, stress generated when laminating is easily distributed and release tends to hardly occur. On the other hand, by setting the thickness to 500 μm or less, crimps tends to be hardly formed when winding after forming the pressure-sensitive adhesive layer.

A gel fraction (ratio of solvent insoluble matter) of the pressure-sensitive adhesive layer of the present invention is not particularly limited, but is preferably 30% to 100% (wt %) and more preferably 40% to 95%. The gel fraction can be measured as an insoluble matter in ethyl acetate, and in detail, as a weight fraction (unit: wt %) of an insoluble matter after the pressure-sensitive adhesive layer is immersed in ethyl acetate at 23° C. for 7 days, with respect to the sample before immersing. By setting the gel fraction to 30% or more, the cohesive force of the pressure-sensitive adhesive layer tends to be improved, and foaming at a high temperature tends to be suppressed. On the other hand, by setting the gel fraction to 95% or less, the pressure-sensitive adhesive layer tends to have proper flexibility and the pressure-sensitive adhesive force tends to be improved, and thus, releasing at a high temperature tends to be suppressed.

Specifically, the gel fraction (solvent insoluble component) is, for example, a value calculated by "Method of measuring gel fraction" to be described below.

(Method of Measuring Gel Fraction)

About 0.1 g of the pressure-sensitive adhesive layer is sampled from the double-sided pressure-sensitive adhesive sheet, wrapped with a porous tetrafluoroethylene sheet (trade name "NTF1122", manufactured by Nitto Denko Corporation) having an average pore size of 0.2 μm, and it is tied up with a kite string and at this time, it is measured for the weight, and the weight measured is designated as the weight before immersion. The weight before immersion is the total weight of the pressure-sensitive adhesive layer (pressure-sensitive adhesive sampled above), the tetrafluoroethylene sheet and the kite string. The total weight of the tetrafluoroethylene sheet and the kite string is also measured, and this weight is designated as the wrapper weight.

Subsequently, the pressure-sensitive adhesive layer of the present invention wrapped with a tetrafluoroethylene sheet and tied up with a kite string (hereinafter referred to as the "sample") is put in a 50 ml-volume vessel filled with ethyl acetate, followed by allowing to stand still at 23° C. for 7 days. The sample (after ethyl acetate treatment) is then taken out of the vessel, and it is transferred to an aluminum-made cup, followed by drying in a dryer at 130° C. for 2 hours to remove ethyl acetate, and it is measured for the weight, and this weight is designated as the weight after immersion.

The gel fraction is calculated according to the following formula:

$$\text{Gel fraction (wt \%)} = ((X-Y)/(Z-Y)) \times 100$$

(wherein X is the weight after immersion, Y is the wrapper weight, and Z is the weight before immersion).

The gel fraction can be controlled by, for example, a monomer composition and a weight average molecular weight of the acrylic polymer (A), a used amount (added amount) of the crosslinking agent, and the like.

The haze of the pressure-sensitive adhesive layer of the present invention (in accordance with JIS K7136) is not particularly limited, but is preferably 3.0% or less and more preferably 1.5% or less. By setting the haze to 3.0% or less, transparency or an appearance of the laminated optical member or optical product becomes better. The haze can be measured, for example, by laminating the pressure-sensitive adhesive layer, which has been left in a normal state (23° C., 50% RH) for at least 24 hours, to a slide glass (for example, total light transmittance of 91.8% and haze of 0.4%), thereby preparing a sample, and using a haze meter (manufactured by Murakami Color Research Laboratory Co., Ltd., trade name "HM-150").

The total light transmittance in a visible light wavelength region of the pressure-sensitive adhesive layer of the present invention (in accordance with JIS K7361-1) is not particularly limited, but is preferably 90% or more, and more preferably 91% or more. By setting the total light transmittance to 90% or more, transparency or an appearance of the laminated optical member or optical product becomes better. The total light transmittance can be measured, for example, by laminating the pressure-sensitive adhesive layer, which has been left in a normal state (23° C., 50% RH) for at least 24 hours, to a slide glass (for example, total light transmittance of 91.8% and haze of 0.4%), thereby preparing a sample, and using a haze meter (manufactured by Murakami Color Research Laboratory Co., Ltd., trade name "HM-150").

The moisture ratio of the pressure-sensitive adhesive layer of the present invention immediately after storage under the environment of 60° C. and 95% RH for 120 hours of the pressure-sensitive adhesive layer of the present invention is not particularly limited, but is preferably 0.65 wt % or more (for example, 0.65 wt % to 5.0 wt %), more preferably 0.65 wt % to 3.0 wt %, and even more preferably 0.75 wt % to 3.0 wt %. By setting the moisture ratio to 0.65 wt % or more, the whitening of the pressure-sensitive adhesive sheet due to humidification tends to hardly occur, and thus, the anti-white turbidity tends to be improved. It is assumed that the aforementioned whitening of the pressure-sensitive adhesive sheet due to humidification is caused when the pressure-sensitive adhesive layer absorbs moisture under a high-temperature and high-humidity environment and then the absorbed moisture is condensed.

The moisture ratio is a value measured immediately after the pressure-sensitive adhesive layer of the present invention is taken to the room temperature environment (23° C. and 50% RH) from the environment of 60° C. and 95% RH under with the pressure-sensitive adhesive layer has been stored for 120 hours (for example, about 0 to 10 minutes after the pressure-sensitive adhesive layer is taken therefrom). In detail, the moisture ratio of the pressure-sensitive adhesive layer of the present invention after storage under the environment of 60° C. and 95% RH for 120 hours can be measured by, for example, a method as disclosed in the following "Method of measuring moisture ratio".

(Method for Measuring Moisture Ratio)
(Preparation of Sample and Measurement of Moisture Ratio)

About 0.2 g of the pressure-sensitive adhesive layer is taken out from the pressure-sensitive adhesive sheet of the present invention to use as a sample. Specifically, in the case where the pressure-sensitive adhesive sheet of the present invention is a sustrateless type double-sided pressure-sensitive adhesive sheet, for example, the sample can be obtained by releasing the release liner, laminating an aluminum foil to one side of the pressure-sensitive adhesive surface, and cutting the layer so that the weight of the pressure-sensitive adhesive layer is about 0.2 g. In the case where the pressure-sensitive adhesive sheet of the present invention is a pressure-sensitive adhesive sheet with a substrate, for example, the sample can be obtained by collecting about 0.2 g of the pressure-sensitive adhesive layer from the pressure-sensitive adhesive sheet with the substrate.

After the sample is stored under the environment of 60° C. and 95% RH for 120 hours, the sample (after storage under the environment of 60° C. and 95% RH for 120 hours) is weighed, and subsequently put it in the following heating vaporization apparatus, and gas generated when heating at 150° C. is introduced into a titration cell of the following coulometric titration moisture measuring apparatus. By the coulometric titration moisture measuring apparatus, the moisture content (μg) of the sample is measured under the following measuring condition, the moisture content per 1 g of the pressure-sensitive adhesive layer of the present invention after storage under the environment of 60° C. and 95% RH for 120 hours (per 1 g of the weight besides the weight of the aluminum foil from the weight of the sample in the case of the double-sided pressure-sensitive adhesive sheet consisting of the pressure-sensitive adhesive layer of the present invention) is obtained, and the moisture ratio (wt %) of the pressure-sensitive adhesive layer is calculated. The number of measurements (n number) is preferably, for example, twice.

(Analysis Apparatus)

Heating vaporization apparatus: "VA-06 type" manufactured by Mitsubishi Chemical Corp.

Coulometric titration moisture measuring apparatus: "CA-06 type" manufactured by Mitsubishi Chemical Corp.

(Measuring Condition)

Method: heating vaporizition method/150° C. heating
Anode solution: Aquamicron AKX
Cathode solution: Aquamicron CXU The moisture ratio can be controlled by kinds and mixed amounts of monomers forming the acrylic polymer (A), kinds and mixed amounts of monomers forming the acrylic polymer (B), and the like.

In the present invention, the pressure-sensitive adhesive layer of the present invention includes the acrylic polymer (A) which has a weight average molecular weight of 100,000 to 3,000,000 and is formed from a component including the nitrogen atom-containing monomers and the hydroxyl group-containing monomers as essential monomer components in the pressure-sensitive adhesive composition forming the pressure-sensitive adhesive layer, and thus, the whitening due to humidification hardly occurs, and excellent anti-white turbidity can be exhibited. In addition, the pressure-sensitive adhesive layer of the present invention includes the acrylic polymer (B) having a weight average molecular weight of 1,000 to 30,000 in the pressure-sensitive adhesive composition forming the pressure-sensitive adhesive layer, foam or release hardly occurs at a high temperature, and high adhesion reliability can be exhibited.

(Other Pressure-Sensitive Adhesive Layer)

The pressure-sensitive adhesive sheet of the present invention may also include other pressure-sensitive adhesive layer (pressure-sensitive adhesive layer other than the pressure-sensitive adhesive layer of the present invention). The other pressure-sensitive adhesive layer is not particularly limited, but examples thereof include a known/general pressure-sensitive adhesive layer that is formed of a known pressure-sensitive adhesive, such as an urethane-based pressure-sensitive adhesive, an acrylic pressure-sensitive adhesive, a rubber-based pressure-sensitive adhesive, a silicon-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive and a fluorine-based pressure-sensitive adhesive. The pressure-sensitive adhesive may be used either alone or in combination of two or more thereof.

(Substrate)

The pressure-sensitive adhesive sheet of the present invention may also include a substrate (that is, may also be a pressure-sensitive adhesive sheet with a substrate). The substrate is not particularly limited, but examples thereof include various optical films such as a plastic film, an antireflection (AR) film, a polarizing plate and a retardation film. As materials of the plastic film and the like, examples thereof include plastic materials such as polyester resins such as polyethylene terephthalate (PET); acrylic resins such as polymethyl methacrylate (PMMA); polycarbonate; triacetyl cellulose (TAC); polysulfone; polyarylate; polyimide; polyvinyl chloride; polyvinyl acetate; polyethylene; polypropylene; ethylene-propylene copolymer; cyclic olefin-based polymer such as trade name "ARTON (cyclic olefin-based polymer; manufactured by JSR)" and trade name "ZEONOR (cyclic olefin-based polymer; manufactured by Nippon Zeon Co., Ltd.)". The plastic materials may be used either alone or in combination of two or more thereof. The "substrate" is a part laminated to an adherend together with the pressure-sensitive adhesive layer, when the pressure-sensitive adhesive sheet is laminated to the adherend (an optical member and the like). The separator (release liner) released in the use (lamination) of the pressure-sensitive adhesive sheet is not included in the "substrate".

The substrate is preferably a transparent substrate. The total light transmittance in a visible light wavelength region of the substrate (in accordance with JIS K7361-1) is not particularly limited, but is preferably 85% or more, and more preferably 88% or more. The haze of the substrate (in accordance with JIS K7136) is not particularly limited, but is preferably 1.5% or less, and more preferably 1.0% or less. The transparent substrate may be a PET film or a non-oriented film such as trade name "ARTON", and trade name "ZEONOR".

The thickness of the substrate is not particularly limited, but for example, is preferably 12 μm to 75 μm. The substrate may have a single layer shape or multilayer shape. On the surface of the substrate, for example, a known/general surface treatment such as a physical treatment such as a corona discharge treatment and a plasma treatment, and a chemical treatment such as an undercoat treatment, may be properly performed.

(Pressure-Sensitive Adhesive Sheet of the Present Invention)

The pressure-sensitive adhesive sheet of the present invention is not particularly limited as long as it includes at least the pressure-sensitive adhesive layer of the present invention, but as described above, is preferably a pressure-sensitive adhesive sheet (substrateless type double-sided pressure-sensitive adhesive sheet) consisting of the pressure-sensitive adhesive layer of the present invention. The pressure-sensitive adhesive sheet of the present invention may include other layers (for example, an intermediate layer, a undercoated layer and the like) in addition to the pressure-sensitive adhesive layer of the present invention, the other pressure-sensitive adhesive layer and the substrate, as long as the effects of the present invention are not impaired.

On the pressure-sensitive adhesive surface of the pressure-sensitive adhesive sheet of the present invention, the separator (release liner) may be provided until it is used. In the case where the pressure-sensitive adhesive sheet of the present invention is a double-sided pressure-sensitive adhesive sheet, each pressure-sensitive adhesive surface may be protected by using separators, respectively, or protected in such a way that the surface is wound in a roll form by using one separator of which both sides are release surfaces. The separator is used as a protective material of the pressure-sensitive adhesive layer, and peeled when the pressure-sensitive adhesive layer is laminated to the adherend. In the case where the pressure-sensitive adhesive sheet of the present invention is a substrateless pressure-sensitive adhesive sheet, the separator functions as a support of the pressure-sensitive adhesive layer. The separator may not be provided. Any known release paper may be used as a separator. The separator may be, but not particularly limited to, for example, a substrate having a release treated layer, a low adhesive substrate composed of a fluorine polymer, or a low adhesive substrate composed of a non-polar polymer. As the substrate having the release treated layer, examples thereof include a plastic film or paper whose surface is treated by a release agent such as silicon type, long-chaine alkyl type, fluorine type, and molybdenum sulfide. As the fluorine-based polymer in the low adhesive substrate composed of fluorine polymer, examples thereof include polytetrafluoroethylene, polychlorotrifluoroethylene, polyvinyl fluoride, polyvinylidene fluoride, a tetrafluoroethylene-hexafluoropropylene copolymer and a chlorofluoroethylene-vinylidene fluoride copolymer. As the non-polar polymer, examples thereof include an olefine-based resin (for example, polyethylene, polypropylene and the like). The separator can be formed by using a known/general method. The thickness of the separator is not particularly limited.

The thickness (total thickness) of the pressure-sensitive adhesive sheet of the present invention is not particularly limited, but is preferably 25 μm to 500 μm, and more preferably 75 μm to 350 μm. By setting the thickness to 25 μm or more, stress generated when laminating is easily distributed and release tends to hardly occur. On the other hand, by setting the thickness to 500 μm or less, it is likely to maintain an excellent appearance as the optical pressure-sensitive adhesive sheet. The whitening due to humidification tends to be suppressed. The thickness of the separator is not included in the thickness of the pressure-sensitive adhesive sheet of the present invention.

The haze of the pressure-sensitive adhesive sheet of the present invention (in accordance with JIS K7136) is not particularly limited, but is preferably 3.0% or less and more preferably 1.5% or less. By setting the haze to 3.0% or less, transparency or an appearance of the laminated optical member or optical product becomes better. The haze can be measured by laminating the pressure-sensitive adhesive sheet, which has been left in a normal state (23° C., 50% RH) for at least 24 hours, and a separator has been released in the case of having a separator, to a slide glass (for example, total light transmittance of 91.8% and haze of 0.4%), thereby preparing a sample, and using a haze meter (manufactured by Murakami Color Research Laboratory Co., Ltd., trade name "HM-150").

The total light transmittance in a visible light wavelength region of the pressure-sensitive adhesive sheet of the present invention (in accordance with JIS K7361-1) is not particularly limited, but is preferably 87% or more, and more preferably 89% or more. By setting the total light transmittance to 87% or more, transparency or an appearance of the laminated optical member or optical product becomes better. The total light transmittance can be measured by laminating the pressure-sensitive adhesive sheet, which has been left in a normal state (23° C., 50% RH) for at least 24 hours, in which a separator has been released in the case of having a separator, to a slide glass (for example, total light transmittance of 91.8% and haze of 0.4%), thereby preparing a sample, and using a haze meter (manufactured by Murakami Color Research Laboratory Co., Ltd., trade name "HM-150").

In the pressure-sensitive adhesive sheet of the present invention, all of the following requirements are preferably satisfied:

the difference between the haze of the pressure-sensitive adhesive sheet immediately after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours is less than 7%;

the difference between the haze of the pressure-sensitive adhesive sheet 30 minutes after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours is less than 7%;

the difference between the haze of the pressure-sensitive adhesive sheet 1 hour after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours is less than 7%;

the difference between the haze of the pressure-sensitive adhesive sheet 3 hours after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours is less than 7%; and the difference between the haze of the pressure-sensitive adhesive sheet 6 hours after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours is less than 7%.

That is, in the pressure-sensitive adhesive sheet of the present invention, all of the following differences in haze are preferably less than 7% (% point), and more preferably less than 5%:

the difference between the haze of the pressure-sensitive adhesive sheet immediately after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours [(haze immediately after being taken to the environment of 23° C. and 50% RH from the environment of 60° C. and 95% RH under which having been stored for 250 hours)−(haze before storage under the environment of 60° C. and 95% RH for 250 hours)];

the difference between the haze of the pressure-sensitive adhesive sheet 30 minutes after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours [(haze 30 minutes after being taken to the environment of 23° C. and 50% RH from the environment of 60° C. and 95% RH under which having been stored for 250 hours)−(haze before storage under the environment of 60° C. and 95% RH for 250 hours)];

the difference between the haze of the pressure-sensitive adhesive sheet 1 hour after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours [(haze 1 hour after being taken to the environment of 23° C. and 50% RH from the environment of 60° C. and 95% RH under which having been stored for 250 hours)−(haze before storage under the environment of 60° C. and 95% RH for 250 hours)];

the difference between the haze of the pressure-sensitive adhesive sheet 3 hours after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours [(haze 3 hours after being taken to the environment of 23° C. and 50% RH from the environment of 60° C. and 95% RH under which having been stored for 250 hours)−(haze before storage under the environment of 60° C. and 95% RH for 250 hours)]; and the difference between the haze of the pressure-sensitive adhesive sheet 6 hours after the pressure-sensitive adhesive sheet is taken to the environment of 23° C. and 50% RH from the environment of 60° C. and 95% RH under which the pressure-sensitive adhesive sheet has been stored for 250 hours, and the haze of the pressure-sensitive adhesive sheet before the storage under the environment of 60° C. and 95% RH for 250 hours [(haze 6 hours after being taken to the environment of 23° C. and 50% RH from the environment of 60° C. and 95% RH under which having been stored for 250 hours)−(haze before storage under the environment of 60° C. and 95% RH for 250 hours)].

By setting the difference between the hazes to less than 7%, an appearance or transparency of the optical product or optical member tends to be hardly negatively influenced. The "haze before the storage under the environment of 60° C. and 95% RH for 250 hours" refers to a haze of the pressure-sensitive adhesive sheet after controlling humidity by leaving under the environment of 23° C. and 50% RH for at least 24 hours.

The difference between the hazes in the pressure-sensitive adhesive sheet of the present invention can be measured by, for example, the following method.

First, the pressure-sensitive adhesive sheet of the present invention is left for at least 24 hours under the environment of 23° C. and 50% RH to control the humidity, and then, the slide glass (for example, total light transmittance of 91.8% and haze of 0.4%) is laminated onto the pressure-sensitive adhesive surface thereof, thereby preparing a test sample. In the case where the pressure-sensitive adhesive sheet of the present invention is a double-sided pressure-sensitive adhesive sheet, a PET film (for example, a haze of 0.6%) having a thickness of 100 μm is laminated onto a pressure-sensitive adhesive surface on the side opposite to the slide glass, thereby preparing a test sample. Subsequently, the haze of the test sample (haze before the storage under the environment of 60° C. and 95% RH for 250 hours) is measured.

Subsequently, the test sample is stored for 250 hours under the environment of 60° C. and 95% RH and taken therefrom to the environment of 23° C. and 50% RH. With respect to the test sample, the haze immediately after the sample is taken therefrom to the environment of 23° C. and 50% RH, the haze 30 minutes after the sample is taken therefrom to the environment of 23° C. and 50% RH, the haze 1 hour after the sample is taken therefrom to the environment of 23° C. and 50% RH, the haze 3 hours after the sample is taken therefrom to the environment of 23° C. and 50% RH, and the haze 6 hours after the sample is taken therefrom to the environment of 23° C. and 50% RH are measured.

Then, the following difference are calculated:

the difference between the haze immediately after the test sample is taken to the environment of 23° C. and 50% RH from the environment of 60° C. and 95% RH under which the test sample has been stored for 250 hours, and the haze before the storage under the environment of 60° C. and 95% RH for 250 hours;

the difference between the haze 30 minutes after the test sample is taken to the environment of 23° C. and 50% RH from the environment of 60° C. and 95% RH under which the test sample has been stored for 250 hours, and the haze before the storage under the environment of 60° C. and 95% RH for 250 hours;

the difference between the haze 1 hour after the test sample is taken to the environment of 23° C. and 50% RH from the environment of 60° C. and 95% RH under which the test sample has been stored for 250 hours, and the haze before the storage under the environment of 60° C. and 95% RH for 250 hours;

the difference between the haze 3 hours after the test sample is taken to the environment of 23° C. and 50% RH from the environment of 60° C. and 95% RH under which the test sample has been stored for 250 hours, and the haze before the storage under the environment of 60° C. and 95% RH for 250 hours; and the difference between the haze 6 hours after the test sample is taken to the environment of 23° C. and 50% RH from the environment of 60° C. and 95% RH under which the test sample has been stored for 250 hours, and the haze before the storage under the environment of 60° C. and 95% RH for 250 hours.

In more detail, the difference can be measured by a method disclosed in a "(4) difference in haze" as described below (evaluation).

The pressure-sensitive adhesive sheet of the present invention can be manufactured by a known and general manufacturing method of the pressure-sensitive adhesive sheet. In the case where the pressure-sensitive adhesive sheet of the present invention is a substrateless pressure-sensitive adhesive sheet, the pressure-sensitive adhesive sheet is obtained by forming the pressure-sensitive adhesive layer of the present invention on the separator by the aforementioned method. In the case where the pressure-sensitive adhesive sheet of the present invention includes a substrate, the pressure-sensitive adhesive layer of the present invention may be directly formed on the surface of the substrate (direct scan method), and may also be formed on the substrate by forming the pressure-sensitive adhesive layer of the present invention on the separator and then transferring (laminating) the formed pressure-sensitive adhesive layer to the substrate (transfer method).

The pressure-sensitive adhesive sheet of the present invention is an optical pressure-sensitive adhesive sheet to be used for an optical use. In more detail, the pressure-sensitive adhesive sheet of the present invention is an optical pressure-sensitive adhesive sheet to be used in lamination of an optical member (for laminating the optical member), manufacture of a product (optical product) in which the optical member is used, and the like.

The optical member refers to a member having an optical characteristic (for example, a polarized property, a photorefractive property, a light scattering property, a light reflective property, a light transmitting property, a light absorbing property, a light diffractive property, an optical rotation property and visibility). The optical member is not particularly limited so long as the optical member is a member having the optical characteristic, and a member constituting the device such as display device (image display device) and input device, or a member used in the device are exemplified, and examples thereof include a polarizing plate, a wave plate, a retardation plate, an optical compensation film, a brightness enhancing film, a light guide plate, a reflective film, an anti-reflective film, a transparent conductive film (e.g. ITO film), a design film, a decoration film, a surface protective film, a prism, lens, a color filter, a transparent substrate, and a member in which these are laminated (collectively referred to as "a functional film" in some cases). Each of the "plate" and the "film" include a plate shape, a film shape, and a sheet shape, and for example, the "polarizing film" includes a "polarizing plate" and a "polarizing sheet".

As the display device, examples thereof include a liquid crystal display device, an organic electroluminescence (EL) display device, a plasma display panel (PDP), an electronic paper and the like. As the input device, examples thereof include a touch panel and the like.

The optical member is not particularly limited, but for example, may be a member composed of glass, acrylic resin, polycarbonate, polyethyleneterephthalate, a metal thin film, or the like (for example, a sheet shape, film shape or plate shape of member). As described above, the "optical member" of the present invention also includes a member (a design film, a decoration film, a surface protective film or the like) for decoration or protection while maintaining visibility of the display device or the input device as an adherend.

A laminating aspect of the optical member with the pressure-sensitive adhesive sheet of the present invention is not particularly limited, but examples thereof include (1) an aspect of laminating optical members with the pressure-sensitive adhesive sheet of the present invention, (2) an aspect of laminating an optical member to a member other than the optical member with the pressure-sensitive adhesive sheet of the present invention, or (3) an aspect of laminating the pressure-sensitive adhesive sheet of the present invention including an optical member to an optical member or a member other than the optical member. In the case of the aspect (3), it is preferred that the pressure-sensitive adhesive sheet of the present invention is a double-sided pressure-sensitive adhesive sheet having an optical member (for example, the optical film and the like) as a substrate.

In the case where the pressure-sensitive adhesive sheet of the present invention is a pressure-sensitive adhesive sheet with a substrate and a functional film is used as the substrate, the pressure-sensitive adhesive sheet of the present invention may also be used as a "pressure-sensitive adhesive functional film" including the pressure-sensitive adhesive layer of the present invention on at least one surface of the functional film.

In the pressure-sensitive adhesive sheet of the present invention, the anti-foaming release property is excellent, and the whitening due to humidification hardly occurs. As a result, in the case where an optical member is laminated by using the pressure-sensitive adhesive sheet of the present invention, since foam or release hardly occurs at a high temperature and whitening (white turbidity) due to humidification (for example, storage under the high-temperature and high-humidity environment) hardly occurs, when the optical member or the product (optical product) manufactured by using the optical member is put under various environments, the appearance or visibility of the display part and the like is not negatively influenced. Accordingly, by using the pressure-sensitive adhesive sheet of the present invention, an aesthetic optical member or optical product can be manufactured.

EXAMPLES

Hereinafter, the present invention will be described in detail based on Examples, but the present invention is not limited to the Examples. The mixing amount (added amount) of "TAKENATE D-110N" in the following description and Table 4 is represented by the added amount (parts by weight) in terms of the solid matter.

Preparation Example 1

Preparation of Acrylic Polymer (A-1)

As shown in Table 2, 55 parts by weight of 2-ethylhexyl acrylate (2EHA), 10 parts by weight of N-vinyl-2-pyrrolidone (NVP), 9 parts by weight of methyl methacrylate (MMA) and 26 parts by weight of 2-hydroxyethyl acrylate (HEA) as monomer components, and 200 parts by weight of ethyl acetate as a polymerization solvent were put into a separable flask, followed by stirring for 1 hour while nitrogen gas was introduced thereto. After oxygen in the polymerization system was removed thereby, 0.2 parts by weight of 2,2'-azobisisobutyronitrile as a polymerization initiator was added, and the system was heated to 63° C., followed by reacting for 10 hours. Thereafter, toluene was added thereto to obtain an acrylic polymer solution (referred to as an "acrylic polymer solution (A-1)") having a solid matter concentration of 30 wt %. The weight average molecular weight of the acrylic polymer (referred to as an "acrylic polymer (A-1)") in the acrylic polymer solution (A-1) was 800,000 as measured by the above device and condition.

Preparation Example 2

Preparation of Acrylic Polymer (A-2)

As shown in Table 2, the acrylic polymer solution (referred to as an "acrylic polymer solution (A-2)") having a solid matter concentration of 30 wt % was obtained in the same manner as in Preparation Example 1, except that 59 parts by weight of 2-ethylhexyl acrylate (2EHA), 7 parts by weight of N-vinyl-2-pyrrolidone (NVP), 13 parts by weight of methyl methacrylate (MMA) and 21 parts by weight of 2-hydroxyethyl acrylate (HEA) were used as monomer components. The weight average molecular weight of the acrylic polymer (referred to as an "acrylic polymer (A-2)") in the acrylic polymer solution (A-2) was 820,000.

Preparation Example 3

Preparation of Acrylic Polymer (A-3)

As shown in Table 2, the acrylic polymer solution (referred to as an "acrylic polymer solution (A-3)") having a solid matter concentration of 30 wt % was obtained in the same manner as in Preparation Example 1, except that 59 parts by weight of 2-ethylhexyl acrylate (2EHA), 15 parts by weight of N-vinyl-2-pyrrolidone (NVP), 9 parts by weight of methyl methacrylate (MMA) and 17 parts by weight of 2-hydroxyethyl acrylate (HEA) were used as monomer components. The weight average molecular weight of the acrylic polymer (referred to as an "acrylic polymer (A-3)") in the acrylic polymer solution (A-3) was 730,000.

Preparation Example 4

Preparation of Acrylic Polymer (A-4)

As shown in Table 2, the acrylic polymer solution (referred to as an "acrylic polymer solution (A-4)") having a solid matter concentration of 30 wt % was obtained in the same manner as in Preparation Example 1, except that 54 parts by weight of 2-ethylhexyl acrylate (2EHA), 20 parts by weight of N-vinyl-2-pyrrolidone (NVP), 9 parts by weight of methyl methacrylate (MMA) and 17 parts by weight of 2-hydroxyethyl acrylate (HEA) were used as monomer components, and the amount of 2,2'-azobisisobutyronitrile used was changed to 0.15 parts by weight. The weight average molecular weight of the acrylic polymer (referred to as an "acrylic polymer (A-4)") in the acrylic polymer solution (A-4) was 920,000.

TABLE 2

| | | Acrylic polymer (A-1) | Acrylic polymer (A-2) | Acrylic polymer (A-3) | Acrylic polymer (A-4) |
|---|---|---|---|---|---|
| Monomer composition [parts by weight] | 2EHA | 55 | 59 | 59 | 54 |
| | NVP | 10 | 7 | 15 | 20 |
| | MMA | 9 | 13 | 9 | 9 |
| | HEA | 26 | 21 | 17 | 17 |
| Weight average molecular weight (Mw) | | 800,000 | 820,000 | 730,000 | 920,000 |

In Table 2, abbreviations are as follows.
2EHA: 2-ethylhexyl acrylate
NVP: N-vinyl-2-pyrrolidone
MMA: Methyl methacrylate
HEA: 2-hydroxyethyl acrylate Preparation Example 5

Preparation of Acrylic Polymer (B-1)

As shown in Table 3, 40 parts by weight of dicyclopentanyl methacrylate (DCPMA) (trade name "FA-513M", manufactured by Hitachi Chemical Co., Ltd.) and 60 parts by weight of methyl methacrylate as monomer components, 3.5 parts by weight of thioglycolic acid as a chain-transfer agent, and 100 parts by weight of toluene as a polymerization solvent were put into the four-necked flask. After the mixture was stirred at 70° C. for 1 hour under nitrogen atmosphere, 0.2 parts by weight of 2,2'-azobisisobutyronitrile as a polymerization initiator was added thereto, followed by reacting at 70° C. for 2 hours and reacting at 80° C. for 2 hours. Thereafter, the reaction solution was placed under the temperature atmosphere of 130° C., and toluene, the chain-transfer agent and an unreacted monomer were dried and removed to obtain the solid-shaped acrylic polymer (B-1). The weight average molecular weight of the acrylic polymer (B-1) was 2,700.

Preparation Example 6

Preparation of Acrylic Polymer (B-2)

As shown in Table 3, the acrylic polymer (B-2) was obtained in the same manner as Preparation Example 5, except that 3.0 parts by weight of α-thioglycerol instead of thioglycolic acid was used as the chain-transfer agent. The weight average molecular weight of the acrylic polymer (B-2) was 2,500.

Preparation Example 7

Preparation of Acrylic Polymer (B-3)

As shown in Table 3, the acrylic polymer (B-3) was obtained in the same manner as Preparation Example 5, except that 4.5 parts by weight of methyl thioglycolate instead of thioglycolic acid was used as the chain-transfer agent. The weight average molecular weight of the acrylic polymer (B-3) was 2,900.

TABLE 3

|  |  | Acrylic Polymer (B-1) | Acrylic Polymer (B-2) | Acrylic Polymer (B-3) |
|---|---|---|---|---|
| Monomer composition [part by weight] | MMA | 60 | 60 | 60 |
|  | DCPMA | 40 | 40 | 40 |
| Chain-transfer agent [part by weight] | Thioglycolic acid | 3.5 | — | — |
|  | α-thioglycerol | — | 3.0 | — |
|  | Methyl thioglycolate | — | — | 4.5 |
| Weight average molecular weight (Mw) |  | 2,700 | 2,500 | 2,900 |

In Table 3, abbreviations are as follows.
MMA: Methyl methacrylate
DCPMA: Dicyclopentanyl methacrylate Example 1

As shown in Table 4, into the obtained acrylic polymer solution (A-1), based on 100 parts by weight of the acrylic polymer (A-1), 5 parts by weight of the acrylic polymer (B-1), 0.5 parts by weight (solid matter conversion) of the isocyanate-based crosslinking agent (trade name "TAKENATE D-110N", manufactured by Mitsui Chemicals, Inc.), and 0.3 parts by weight of the silane coupling agent (trade name "KBM-403", manufactured by Shin-Etsu Chemical Co., Ltd.) were added and mixed to prepare a pressure-sensitive adhesive composition.

Next, the pressure-sensitive adhesive composition was coated on the release-treated surface of the polyethylene-terephthalate separator (PET separator) (trade name "MRF 75", manufactured by Mitsubishi Plastics Inc.) so that the thickness after drying was 50 μm, followed by heating and drying under normal pressure at 60° C. for 3 min and at 155° C. for 4 min, and then, aging was further performed at 50° C. for 72 hours to obtain a double-sided pressure-sensitive adhesive sheet (substrateless double-sided pressure-sensitive adhesive sheet).

Example 2

As shown in Table 4, the double-sided pressure-sensitive adhesive sheet (substrateless double-sided pressure-sensitive adhesive sheet) was obtained in the same manner as Example 1, except that the obtained acrylic polymer solution (A-2) was used instead of the acrylic polymer solution (A-1), 5 parts by weight of the obtained acrylic polymer (B-2) (with respect to 100 parts by weight of the acrylic polymer (A-2)) was mixed instead of the acrylic polymer (B-1), and the mixed amount of the isocyanate-based crosslinking agent ("TAKENATE D-110N") was changed to 0.7 parts by weight (solid matter conversion, with respect to 100 parts by weight of the acrylic polymer (A-2)).

Example 3

As shown in Table 4, the double-sided pressure-sensitive adhesive sheet (substrateless double-sided pressure-sensitive adhesive sheet) was obtained in the same manner as Example 2, except that 5 parts by weight of the obtained acrylic polymer (B-3) (with respect to 100 parts by weight of the acrylic polymer (A-2)) was mixed instead of the acrylic polymer (B-2).

Example 4

As shown in Table 4, the double-sided pressure-sensitive adhesive sheet (substrateless double-sided pressure-sensitive adhesive sheet) was obtained in the same manner as Example 1, except that the obtained acrylic polymer solution (A-3) was used instead of the acrylic polymer solution (A-1), and the mixed amount of the isocyanate-based crosslinking agent ("TAKENATE D-110N") was changed to 0.7 parts by weight (solid matter conversion, with respect to 100 parts by weight of the acrylic polymer (A-3)).

Comparative Example 1

As shown in Table 4, the double-sided pressure-sensitive adhesive sheet (substrateless double-sided pressure-sensitive adhesive sheet) was obtained in the same manner as Example 1, except that the obtained acrylic polymer solution (A-4) was used instead of the acrylic polymer solution (A-1), and the acrylic polymer (B-1) was not used (added).

(Evaluation)

The following evaluation was performed with respect to the double-sided pressure-sensitive adhesive sheet obtained in the Examples and Comparative Example. The gel fraction of the acrylic pressure-sensitive adhesive layer was measured by the above-described "Method of measuring gel fraction", and the measured result was shown in the column "gel fraction" of Table 4.

(1) Anti-White Turbidity

The separator was released from the double-sided pressure-sensitive adhesive sheet obtained in the Examples and the Comparative Example, one of the pressure-sensitive adhesive surfaces of the double-sided pressure-sensitive adhesive sheet was laminated to the slide glass (manufactured by Matsunami Glass Ind., Ltd., trade name "MICRO SLIDE GLASS", lot No. "S", thickness of 1.3 mm, haze of 0.1%, ground edges), and the other pressure-sensitive adhesive surface was laminated to a PET film (manufactured by Toyobo Co., Ltd., trade name "A4100", thickness of 100 μM, haze of 0.6%), thereby preparing a test sample having a configuration of the "slide glass/double-sided pressure-sensitive adhesive sheet (pressure-sensitive adhesive layer)/PET film". The haze of the test sample was measured under the environment of 23° C. and 50% RH by using a haze meter (trade name "HM-150", manufactured by Murakami Color Research Laboratory Co., Ltd.) (referred to as a "haze before humidification").

Subsequently, the following hazes of the test sample was measured in the same manner as described above (referred to as a "haze after humidification"): immediately after the test sample was taken to the environment of 23° C. and 50% RH from the environment of 60° C. and 95% RH (the heat and humidity environment) under which the test sample had been stored for 120 hours.

An increment of the haze due to humidification (=[haze after humidification (%)]—[haze before humidification (%)]) was calculated from the measured haze before humidification and haze after humidification, thereby evaluating the anti-white turbidity on the basis of the following criteria. The results are shown in the column of "anti-white turbidity" in Table 4.

The case where the increment of the haze due to humidification is less than 3%: AA (very good in anti-white turbidity)

The case where the increment of the haze due to humidification is 3% or more and less than 5%: A (good in anti-white turbidity)

The case where the increment of the haze due to humidification is 5% or more: B (poor in anti-white turbidity)

(2) Anti-Foaming Release Property (Anti-Foaming Property and Anti-Release Property)

One of the pressure-sensitive adhesive surfaces of the double-sided pressure-sensitive adhesive sheet obtained in the Examples and the Comparative Example was exposed, and the pressure-sensitive adhesive surface was laminated to an acrylic plate having a thickness of 1 mm (manufactured by Mitsubishi Rayon Co., Ltd., trade name "ACRYLITE"). Subsequently, the other pressure-sensitive adhesive surface of the double-sided pressure-sensitive adhesive sheet was laminated to a polyester film having a thickness of 100 μm (manufactured by Toyobo Co., Ltd., trade name "A4100"). The obtained laminated structure (having a layered configuration of "acrylic plate/double-sided pressure-sensitive adhesive sheet (pressure-sensitive adhesive layer)/polyester film") was left standing under the environment of 50° C. for 1 day to be sufficiently adapted thereto, and then, the laminated structure was left standing under the environment of 85° C. for 4 days. Thereafter, an adhesive interface between the pressure-sensitive adhesive layer and the acrylic plate of the laminated structure was observed with an eye, and presence/absence of foam and release was checked, and an average diameter of a foam generated was checked in the case where the foam occurred.

With respect to the foam (antifoaming property), in the case where the foam did not occur or in the case where the average diameter of the generated foam was less than 1 mm, the anti-foaming property was evaluated as "A (good)" and in the case where the average diameter of the generated foam was 1 mm or more, the anti-foaming property was evaluated as "B (poor)".

With respect to the release (anti-release property), in the case where the release did not occur, the anti-release property was evaluated as "A (good)" and in the case where the release occurred, the anti-release property was evaluated as "B (poor)".

The results are shown in the column of "anti-foaming property" and the column of "anti-release property" in Table 4, respectively.

(3) 180° Peeling Pressure-Sensitive Adhesive Force (to Glass)

The separator was released from the double-sided pressure-sensitive adhesive sheet obtained in the Examples and Comparative Example, a PET film (thickness of 25 μm) was laminated to one of the pressure-sensitive adhesive surfaces thereof and reinforced, and cut in the size of a width of 20 mm and a length of 100 mm, thereby preparing a test sample. Subsequently, the pressure-sensitive adhesive surface (the other pressure-sensitive adhesive surface of the double-sided pressure-sensitive adhesive sheet) of the test sample was pressure-contacted with a glass plate (manufactured by Matsunami Glass Ind., Ltd., trade name "SLIDE GLASS lot No. 5", 50 mm of width×100 mm of length, thickness of 1.3 mm) by moving a 2-kg rubber roller back and forth once, and aging was performed under the atmosphere of the 23° C. and 50% RH for 30 minutes.

Thereafter, in accordance with JIS Z0237 (2000), under the atmosphere of 23° C. and 50% RH, the test sample was peeled from the glass plate by using a tensile tester (manufactured by Minebea Co, Ltd., trade name "TG-1 kN") under the condition of a tensile speed of 300 mm/min and a peeling angle of 180°, and the 180° peeling pressure-sensitive adhesive force (unit: N/20 mm) was measured. The average value was calculated by setting the number of measurements (n number) twice. The results were shown in the column of "180° peeling pressure-sensitive adhesive force (to glass)" in Table 4.

(4) Difference in Haze

The separator was released from the double-sided pressure-sensitive adhesive sheet obtained in the Examples and the Comparative Example, one of the pressure-sensitive adhesive surfaces of the double-sided pressure-sensitive adhesive sheet was laminated to the slide glass (total light transmittance of 91.8%, haze of 0.4%), and the other pressure-sensitive adhesive surface thereof was laminated to a PET film (manufactured by Toyobo Co., Ltd., trade name "A4100", thickness of 100 μm, haze of 0.6%), thereby preparing a test sample having a configuration of the "slide glass/double-sided pressure-sensitive adhesive sheet (pressure-sensitive adhesive layer)/PET film". Subsequently, the test sample was left standing under the environment of 23° C. and 50% RH for 24 hours. Next, the haze of the test sample (haze before the storage under the environment of 60° C. and 95% RH) was measured under the environment of 23° C. and 50% RH by using a haze meter (trade name "HM-150", manufactured by Murakami Color Research Laboratory Co., Ltd.). The results are shown in the column "haze before storage under environment of 60° C. and 95% RH for 250 hours" in Table 4.

Subsequently, the test sample was stored for 250 hours in a thermo-hygrostat (manufactured by Espec Corporation, trade name "SH-261") in which the atmosphere in the thermo-hygrostat was set to 60° C. and 95% RH, and thereafter, the test sample was taken therefrom to the environment of 23° C. and 50% RH. The haze immediately after the test samples was taken therefrom to the environment of 23° C. and 50% RH, the haze 30 minutes after the test samples was taken therefrom to the environment of 23° C. and 50% RH, the haze 1 hour after the test samples was taken therefrom to the environment of 23° C. and 50% RH, the haze 3 hours after the test samples was taken therefrom to the environment of 23° C. and 50% RH, and the haze 6 hours after the test sample was taken therefrom to the environment of 23° C. and 50% RH, were measured as described above. The results are shown in the column "haze after storage under environment of 60° C. and 95% RH for 250 hours" in Table 4.

The difference (difference in haze) between each of the hazes after storage under the environment of 60° C. and 95% RH for 250 hours (immediately after, 30 minutes after, 1 hour after, 3 hours after, and 6 hours after the test sample was taken therefrom to the environment of 23° C. and 50% RH) and the haze before the storage under the environment of 60° C. and 95% RH was calculated. The results are shown in the column of "difference in haze" in Table 4.

TABLE 4

| | | | Ex. 1 | Ex. 2 | Ex. 3 | Ex. 4 | Comp. Ex. 1 |
|---|---|---|---|---|---|---|---|
| Pressure-sensitive adhesive composition | Acrylic polymer (A) [part by weight] | (A-1) | 100 | — | — | — | — |
| | | (A-2) | — | 100 | 100 | — | — |
| | | (A-3) | — | — | — | 100 | — |
| | | (A-4) | — | — | — | — | 100 |
| | Acrylic polymer (B) [part by weight] | (B-1) | 5 | — | — | 5 | — |
| | | (B-2) | — | 5 | — | — | — |
| | | (B-3) | — | — | 5 | — | — |
| | Crosslinking agent [part by weight] | TAKENATE D-110N | 0.5 | 0.7 | 0.7 | 0.7 | 0.5 |
| | Silane coupling agent [part by weight] | KBM-403 | 0.3 | 0.3 | 0.3 | 0.3 | 0.3 |
| Pressure-sensitive adhesive layer | Thickness [μm] | | 50 | 50 | 50 | 50 | 50 |
| | Gel fraction [%] | | 82 | 82 | 81 | 83 | 84 |
| Evaluation | Anti-white turbidity | | AA | AA | AA | A | A |
| | Anti-foaming release property | Anti-foaming property | A | A | A | A | B |
| | | Anti-release property | A | A | A | A | B |
| | 180° peeling pressure-sensitive adhesive force (to glass) [N/20 mm] | | 14.7 | 14.5 | 14.3 | 17.0 | 8.1 |
| | Haze before storage under environment of 60° C. and 95% RH for 250 hours [%] | | 0.7 | 0.7 | 0.7 | 0.7 | 0.7 |
| | Haze after storage under environment of 60° C. and 95% RH for 250 hours [%] | Immediately after taken | 1.1 | 1.1 | 1.2 | 1.7 | 1.8 |
| | | 30 minutes after taken | 1.0 | 0.9 | 1.0 | 1.6 | — |
| | | 1 hour after taken | 0.9 | 0.9 | 0.9 | 1.4 | 1.5 |
| | | 3 hours after taken | 0.8 | 0.8 | 0.8 | 0.9 | 1.0 |
| | | 6 hours after taken | 0.7 | 0.7 | 0.6 | 0.7 | — |
| | Difference in haze [% (% point)] | [Immediately after taken] – [Before storage] | 0.4 | 0.4 | 0.5 | 1.0 | 1.1 |
| | | [30 minutes after taken] – [Before storage] | 0.3 | 0.2 | 0.3 | 0.9 | — |
| | | [1 hour after taken] – [Before storage] | 0.2 | 0.2 | 0.2 | 0.7 | 0.8 |
| | | [3 hours after taken] – [Before storage] | 0.1 | 0.1 | 0.1 | 0.2 | 0.3 |
| | | [6 hours after taken] – [Before storage] | 0.0 | 0.0 | −0.1 | 0.0 | — |

In Table 4, abbreviations are as follows.
TAKENATE D-110N: trade name "TAKENATE D-110N", manufactured by Mitsui Chemicals, Inc.
ICBM-403: trade name "KBM-403", manufactured by Shin-Etsu Chemical Co., Ltd.

As apparent from the results of Table 4, in the pressure-sensitive adhesive sheet of the present invention (Examples), whitening did not occur even when being stored under humidification (that is, the anti-white turbidity was excellent) and the anti-foaming release property was excellent. On the other hand, in the case where the acrylic polymer (B) was not contained (Comparative Example), the anti-white turbidity was good, but the anti-foaming release property was poor.

While the invention has been described in detail and with reference to specific embodiments thereof, it will be apparent to one skilled in the art that various changes and modifications can be made therein without departing from the spirit and scope thereof.

This application is based on Japanese Patent Application No. 2011-101855 filed on Apr. 28, 2011, the entire subject matter of which is incorporated herein by reference.

The present invention provides the following optical pressure-sensitive adhesive sheet.

(1) An optical pressure-sensitive adhesive sheet, comprising:
a pressure-sensitive adhesive layer formed from a pressure-sensitive adhesive composition comprising: an acrylic polymer (A) which has a weight average molecular weight of 100,000 to 3,000,000 and is formed from a component comprising, as essential monomer components, a monomer having a nitrogen atom in a molecule thereof and a monomer having a hydroxyl group in a molecule thereof; and an acrylic polymer (B) having a weight average molecular weight of 1,000 to 30,000.

(2) The optical pressure-sensitive adhesive sheet according to (1), wherein the component forming the acrylic polymer (A) further comprises, as a monomer component, alkyl(meth)acrylate having a linear or branched alkyl group.

(3) The optical pressure-sensitive adhesive sheet according to (2), wherein a content of the alkyl(meth)acrylate having a linear or branched alkyl group is 30 wt % to 89 wt % based on a total amount (100 wt %) of the monomer components forming the acrylic polymer (A).

(4) The optical pressure-sensitive adhesive sheet according to any one of (1) to (3), wherein the acrylic polymer (B) is formed from a component comprising, as essential monomer components, (meth)acrylate having a cyclic structure in a molecule thereof, and alkyl(meth)acrylate having a linear or branched alkyl group.

(5) The optical pressure-sensitive adhesive sheet according to (4), wherein a content of the (meth)acrylate having a cyclic structure in a molecule thereof is 10 wt % to 90 wt %, and a content of the alkyl(meth)acrylate having a linear or branched alkyl group is 10 wt % to 90 wt %, based on a total amount (100 wt %) of the monomer components forming the acrylic polymer (B).

(6) The optical pressure-sensitive adhesive sheet according to any one of (1) to (5), wherein a content of the monomer having a nitrogen atom in a molecule thereof is 1 wt % to 30 wt % based on a total amount (100 wt %) of the monomer components forming the acrylic polymer (A).

(7) The optical pressure-sensitive adhesive sheet according to any one of (1) to (6), wherein a content of the monomer having a hydroxyl group in a molecule thereof is 10 wt % to 50 wt % based on a total amount (100 wt %) of the monomer components forming the acrylic polymer (A).

(8) The optical pressure-sensitive adhesive sheet according to any one of (1) to (7), wherein a content of the acrylic polymer (B) in the pressure-sensitive adhesive composition is 1 part by weight to 50 parts by weight based on 100 parts by weight of the acrylic polymer (A).

(9) The optical pressure-sensitive adhesive sheet according to any one of (1) to (8), wherein a difference between a haze of the optical pressure-sensitive adhesive sheet immediately after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 30 minutes after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 1 hour after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 3 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%; and a difference between a haze of the optical pressure-sensitive adhesive sheet 6 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%.

What is claimed is:

1. An optical pressure-sensitive adhesive sheet, comprising:
a pressure-sensitive adhesive layer formed from a pressure-sensitive adhesive composition comprising:
an acrylic polymer (A) which has a weight average molecular weight of 100,000 to 3,000,000 and is formed from a component comprising, as essential monomer components, a monomer having a nitrogen atom in a molecule thereof and a monomer having a hydroxyl group in a molecule thereof, wherein the component does not substantially comprise a monomer having a carboxyl group in a molecule thereof; and
an acrylic polymer (B) having a weight average molecular weight of 1,000 to 30,000, wherein the acrylic polymer (B) is formed from a component comprising, as essential monomer components, (meth)acrylate having a cyclic structure in a molecule thereof, and alkyl(meth)acrylate having a linear or branched alkyl group.

2. The optical pressure-sensitive adhesive sheet according to claim 1, wherein the component forming the acrylic polymer (A) further comprises, as a monomer component, alkyl (meth)acrylate having a linear or branched alkyl group.

3. The optical pressure-sensitive adhesive sheet according to claim 2, wherein a content of the alkyl(meth)acrylate having a linear or branched alkyl group is 30 wt % to 89 wt % based on a total amount (100 wt %) of the monomer components forming the acrylic polymer (A).

4. The optical pressure-sensitive adhesive sheet according to claim 1, wherein a content of the (meth)acrylate having a cyclic structure in a molecule thereof is 10 wt % to 90 wt %, and a content of the alkyl(meth)acrylate having a linear or branched alkyl group is 10 wt % to 90 wt %, based on a total amount (100 wt %) of the monomer components forming the acrylic polymer (B).

5. The optical pressure-sensitive adhesive sheet according to claim 1, wherein a content of the monomer having a nitrogen atom in a molecule thereof is 1 wt % to 30 wt % based on a total amount (100 wt %) of the monomer components forming the acrylic polymer (A).

6. The optical pressure-sensitive adhesive sheet according to claim 1, wherein a content of the monomer having a hydroxyl group in a molecule thereof is 10 wt % to 50 wt % based on a total amount (100 wt %) of the monomer components forming the acrylic polymer (A).

7. The optical pressure-sensitive adhesive sheet according to claim 1, wherein a content of the acrylic polymer (B) in the pressure-sensitive adhesive composition is 1 part by weight to 50 parts by weight based on 100 parts by weight of the acrylic polymer (A).

8. The optical pressure-sensitive adhesive sheet according to claim 1, wherein
a difference between a haze of the optical pressure-sensitive adhesive sheet immediately after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 30 minutes after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 1 hour after the optical pressure-sensitive adhesive sheet is taken to the environment of 23° C. and 50% RH from the environment of 60° C. and 95% RH under which the optical pressuresensitive adhesive sheet has been stored for 250 hours, and a haze of the optical pressure-sensitive adhesive sheet before the storage under the environment of 60° C. and 95% RH for 250 hours is less than 7%;

a difference between a haze of the optical pressure-sensitive adhesive sheet 3 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%; and a difference between a haze of the optical pressure-sensitive adhesive sheet 6 hours after the optical pressure-sensitive adhesive sheet is taken to the environment of 23° C. and 50% RH from the environment of 60° C. and 95% RH under which the optical pressure-sensitive adhesive sheet has been stored for 250 hours, and a haze of the optical pressure-sensitive adhesive sheet before the storage under the environment of 60° C. and 95% RH for 250 hours is less than 7%.

9. The optical pressure-sensitive adhesive sheet according to claim 2, wherein the acrylic polymer (B) is formed from a component comprising, as essential monomer components, (meth)acrylate having a cyclic structure in a molecule thereof, and alkyl(meth)acrylate having a linear or branched alkyl group.

10. The optical pressure-sensitive adhesive sheet according to claim 3, wherein the acrylic polymer (B) is formed from a component comprising, as essential monomer components, (meth)acrylate having a cyclic structure in a molecule thereof, and alkyl(meth)acrylate having a linear or branched alkyl group.

11. The optical pressure-sensitive adhesive sheet according to claim 9, wherein a content of the (meth)acrylate having a cyclic structure in a molecule thereof is 10 wt % to 90 wt %, and a content of the alkyl(meth)acrylate having a linear or branched alkyl group is 10 wt % to 90 wt %, based on a total amount (100 wt %) of the monomer components forming the acrylic polymer (B).

12. The optical pressure-sensitive adhesive sheet according to claim 10, wherein a content of the (meth)acrylate having a cyclic structure in a molecule thereof is 10 wt % to 90 wt %, and a content of the alkyl(meth)acrylate having a linear or branched alkyl group is 10 wt % to 90 wt %, based on a total amount (100 wt %) of the monomer components forming the acrylic polymer (B).

13. The optical pressure-sensitive adhesive sheet according to claim 2, wherein a content of the monomer having a nitrogen atom in a molecule thereof is 1 wt % to 30 wt % based on a total amount (100 wt %) of the monomer components forming the acrylic polymer (A).

14. The optical pressure-sensitive adhesive sheet according to claim 3, wherein a content of the monomer having a nitrogen atom in a molecule thereof is 1 wt % to 30 wt % based on a total amount (100 wt %) of the monomer components forming the acrylic polymer (A).

15. The optical pressure-sensitive adhesive sheet according to claim 1, wherein a content of the monomer having a nitrogen atom in a molecule thereof is 1 wt % to 30 wt % based on a total amount (100 wt %) of the monomer components forming the acrylic polymer (A).

16. The optical pressure-sensitive adhesive sheet according to claim 9, wherein a content of the monomer having a nitrogen atom in a molecule thereof is 1 wt % to 30 wt % based on a total amount (100 wt %) of the monomer components forming the acrylic polymer (A).

17. The optical pressure-sensitive adhesive sheet according to claim 10, wherein a content of the monomer having a nitrogen atom in a molecule thereof is 1 wt % to 30 wt % based on a total amount (100 wt %) of the monomer components forming the acrylic polymer (A).

18. The optical pressure-sensitive adhesive sheet according to claim 4, wherein a content of the monomer having a nitrogen atom in a molecule thereof is 1 wt % to 30 wt % based on a total amount (100 wt %) of the monomer components forming the acrylic polymer (A).

19. The optical pressure-sensitive adhesive sheet according to claim 11, wherein a content of the monomer having a nitrogen atom in a molecule thereof is 1 wt % to 30 wt % based on a total amount (100 wt %) of the monomer components forming the acrylic polymer (A).

* * * * *